US010415685B2

(12) United States Patent
Imai et al.

(10) Patent No.: US 10,415,685 B2
(45) Date of Patent: Sep. 17, 2019

(54) PULLEY STRUCTURE

(71) Applicant: Mitsuboshi Belting Ltd., Kobe-shi, Hyogo (JP)

(72) Inventors: Katsuya Imai, Hyogo (JP); Hayato Shimamura, Hyogo (JP)

(73) Assignee: Mitsuboshi Belting Ltd., Kobe-shi, Hyogo (JP)

( * ) Notice: Subject to any disclaimer, the term of this patent is extended or adjusted under 35 U.S.C. 154(b) by 0 days.

(21) Appl. No.: 15/550,815

(22) PCT Filed: Feb. 18, 2016

(86) PCT No.: PCT/JP2016/054646
§ 371 (c)(1),
(2) Date: Aug. 14, 2017

(87) PCT Pub. No.: WO2016/133148
PCT Pub. Date: Aug. 25, 2016

(65) Prior Publication Data
US 2018/0045287 A1 Feb. 15, 2018

(30) Foreign Application Priority Data

Feb. 20, 2015 (JP) .................................. 2015-031338
Jan. 25, 2016 (JP) .................................. 2016-011352

(51) Int. Cl.
*F16H 55/36* (2006.01)
*F16C 33/72* (2006.01)
(Continued)

(52) U.S. Cl.
CPC ........... *F16H 55/36* (2013.01); *F16C 33/726* (2013.01); *F16C 33/782* (2013.01); *F16D 3/00* (2013.01);
(Continued)

(58) Field of Classification Search
CPC .............. F16H 55/36; F16H 2055/366; E05Y 2201/49; E05Y 2800/22; F02N 15/023
(Continued)

(56) References Cited

U.S. PATENT DOCUMENTS 7,766,774 B2   8/2010   Antchak et al.
7,975,821 B2   7/2011   Antchak et al.
(Continued)

FOREIGN PATENT DOCUMENTS

CN        1693729 A     11/2005
CN      101111692 A      1/2008
(Continued)

OTHER PUBLICATIONS

Mar. 29, 2016—International Search Report—Intl App PCT/JP2016/054646.
(Continued)

*Primary Examiner* — Henry Y Liu
(74) *Attorney, Agent, or Firm* — Banner & Witcoff, Ltd.

(57) ABSTRACT

The pulley structure includes a ventilation path that is formed at a position shifted in a radial direction from a rotating axis of a first rotating body and allows a spring accommodation space, formed between the first rotating body and a second rotating body, and the outside to communicate with each other. At least a part of the ventilation path is formed in an end cap that blocks an opening portion on one side of the first rotating body in a rotating axis direction. The end cap blocks the opening portion of the first rotating body such that the spring accommodation space does not communicate with the outside toward the one side in the rotating axis direction other than the ventilation path.

9 Claims, 10 Drawing Sheets

(51) Int. Cl.
*F16C 33/78* (2006.01)
*F16D 3/00* (2006.01)
*F02B 67/06* (2006.01)
*F16D 7/02* (2006.01)

(52) U.S. Cl.
CPC ............ *F02B 67/06* (2013.01); *F16C 2361/63* (2013.01); *F16D 7/02* (2013.01); *F16H 2055/366* (2013.01)

(58) Field of Classification Search
USPC ..................................................... 474/70, 94
See application file for complete search history.

(56) References Cited

U.S. PATENT DOCUMENTS

| | | | |
|---|---|---|---|
| 8,132,657 B2 | 3/2012 | Antchak et al. | |
| 2005/0087417 A1* | 4/2005 | Shimomura | F02N 15/023 192/45.015 |
| 2005/0245337 A1* | 11/2005 | Matsuyama | F16H 55/36 474/199 |
| 2008/0053778 A1 | 3/2008 | Shimomura et al. | |
| 2008/0194339 A1* | 8/2008 | Antchak | F16D 7/022 464/40 |
| 2008/0312014 A1* | 12/2008 | Stief | F16F 15/123 474/94 |
| 2009/0197719 A1* | 8/2009 | Ali | F16D 7/021 474/94 |
| 2009/0305828 A1* | 12/2009 | Rasche | F02B 67/06 474/94 |
| 2010/0252387 A1 | 10/2010 | Antchak et al. | |
| 2011/0043083 A1* | 2/2011 | Hamada | F16H 55/36 310/75 R |
| 2011/0065537 A1* | 3/2011 | Serkh | F16D 7/022 474/94 |
| 2011/0162938 A1 | 7/2011 | Antchak et al. | |
| 2011/0245000 A1* | 10/2011 | Serkh | F16F 15/1216 474/94 |
| 2012/0088616 A1* | 4/2012 | Ali | F16F 15/121 474/94 |
| 2013/0217524 A1* | 8/2013 | Antchak | F02B 67/06 474/94 |
| 2013/0324335 A1* | 12/2013 | Chen | F16D 41/206 474/94 |
| 2014/0051533 A1* | 2/2014 | Yoneda | F16H 7/1218 474/113 |
| 2015/0184703 A1* | 7/2015 | Shimamura | F16D 3/74 192/415 |
| 2015/0276039 A1* | 10/2015 | Williams | F16D 41/206 474/94 |
| 2016/0091048 A1* | 3/2016 | Tran | F16H 55/36 474/94 |
| 2016/0201757 A1* | 7/2016 | Tran | F16D 3/10 474/94 |

FOREIGN PATENT DOCUMENTS

| | | |
|---|---|---|
| EP | 2703690 A1 | 3/2014 |
| JP | S62-151466 U | 9/1987 |
| JP | 2003-232434 A | 8/2003 |
| JP | 2009-162332 A | 7/2009 |
| JP | 2011-045170 A | 3/2011 |
| JP | 2014-114947 A | 6/2014 |
| WO | 03/067128 A1 | 8/2003 |

OTHER PUBLICATIONS

Sep. 28, 2018—(EP) Extended Search Report—App 16752534.4.
Dec. 14, 2018—(CN) Notification of First Office Action—App 201680010995.7, Eng Tran.
Sep. 3, 2018—(KR) Office Action—App 10-2017-7023081, Eng Tran.
Nov. 28, 2017—(JP) Notification of Reasons for Refusal—App 2016-011352, Eng Tran.
Aug. 2, 2018—(CA) Office Action—App 2,975,987.

* cited by examiner

[FIG 1]
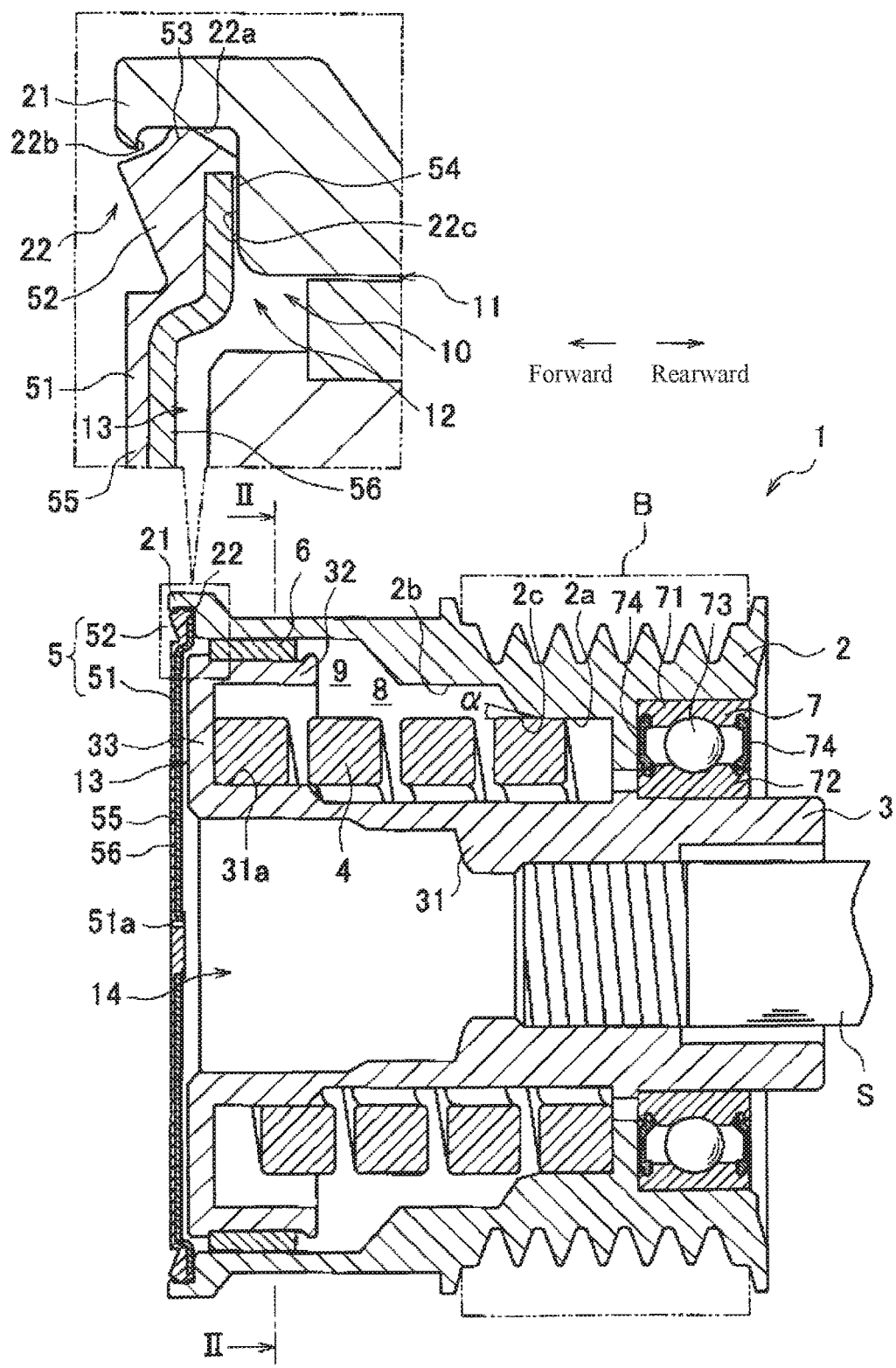

[FIG 2]
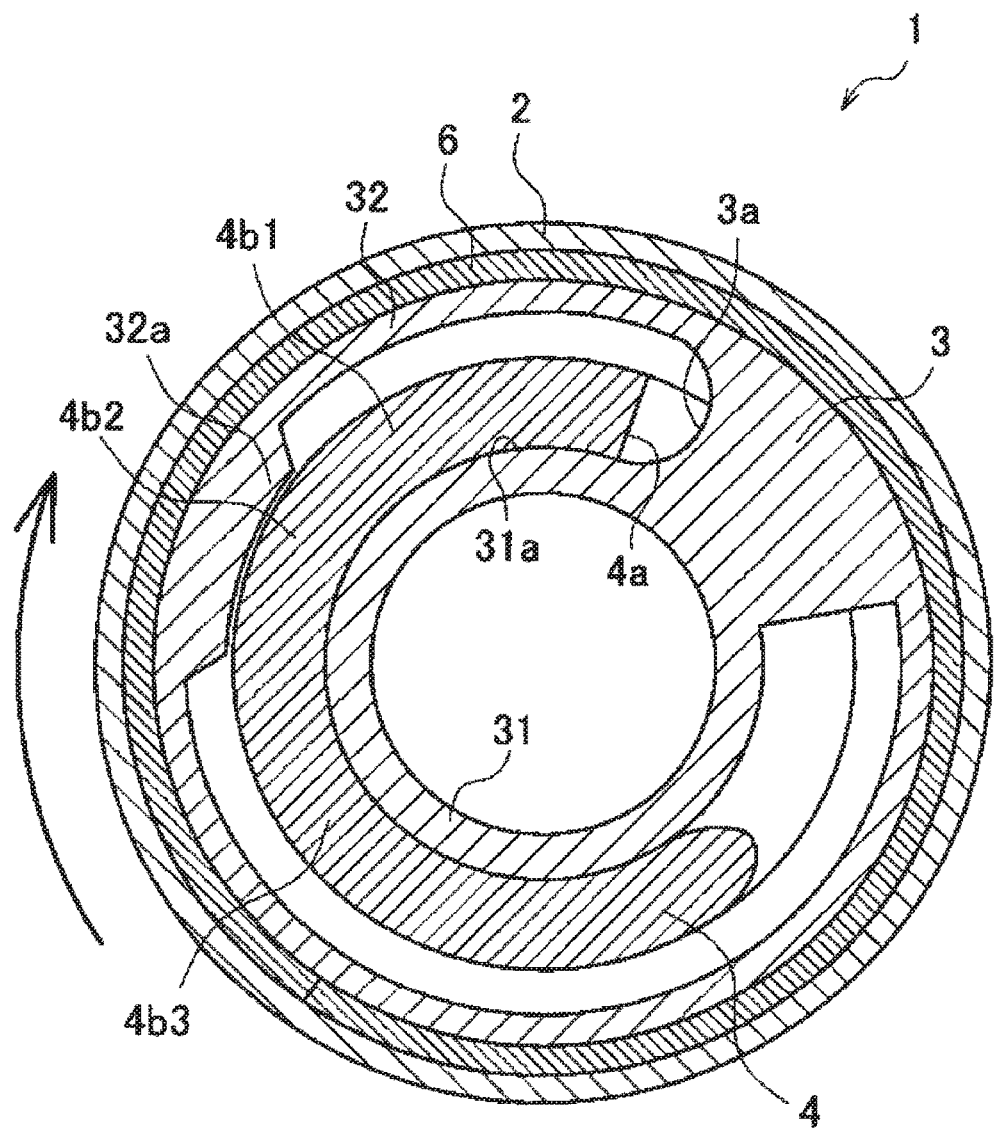

[FIG 3]
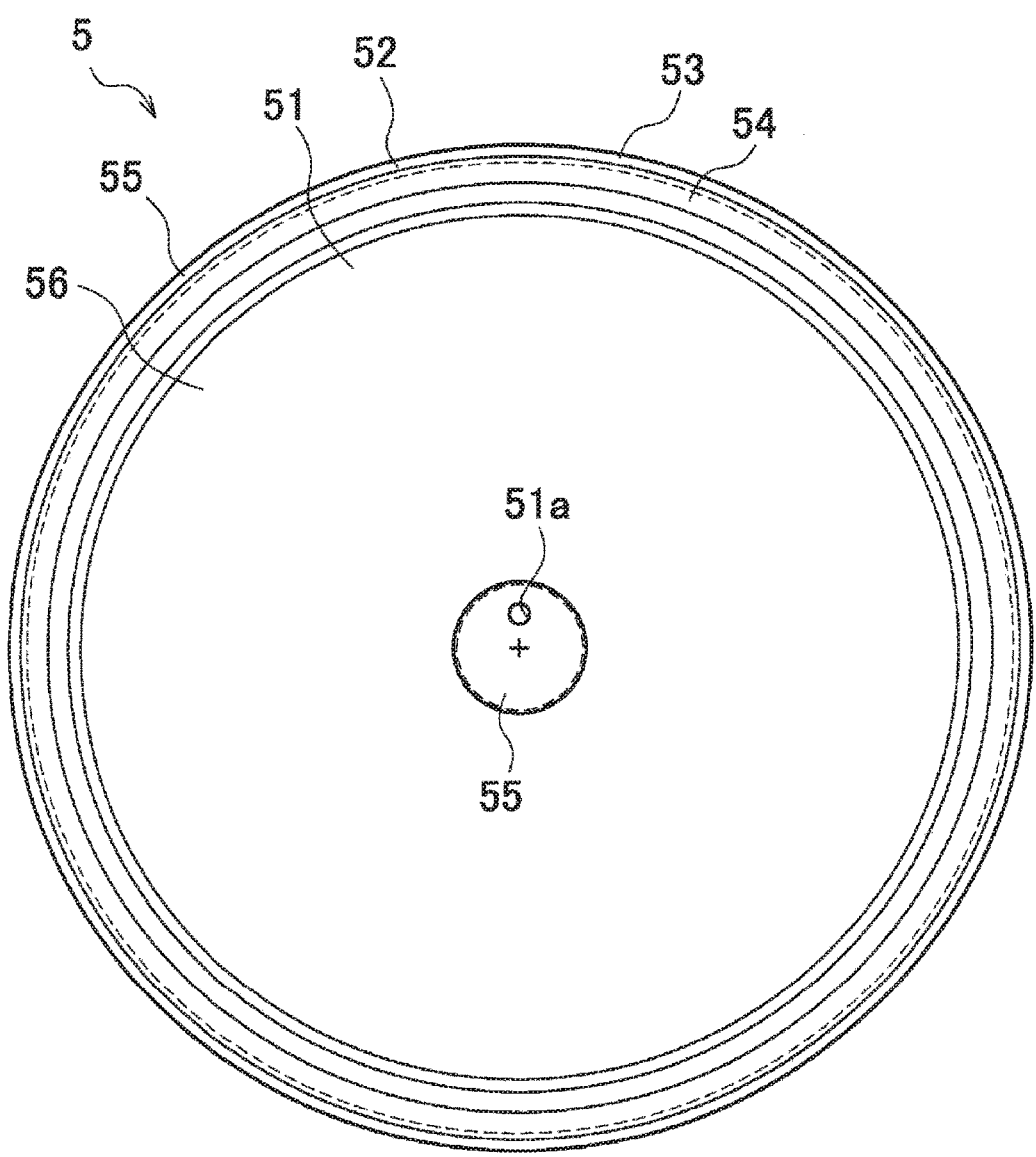

[FIG 4]
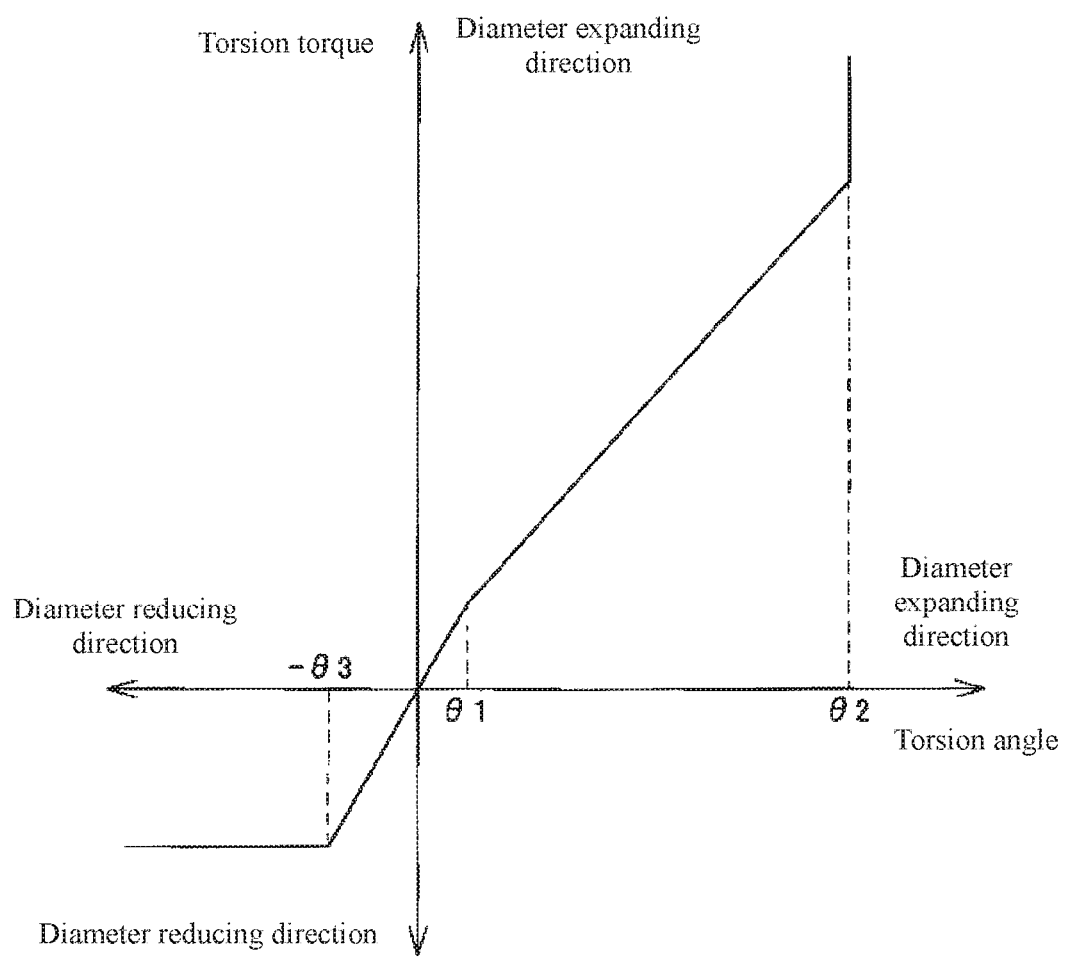

[FIG 5]
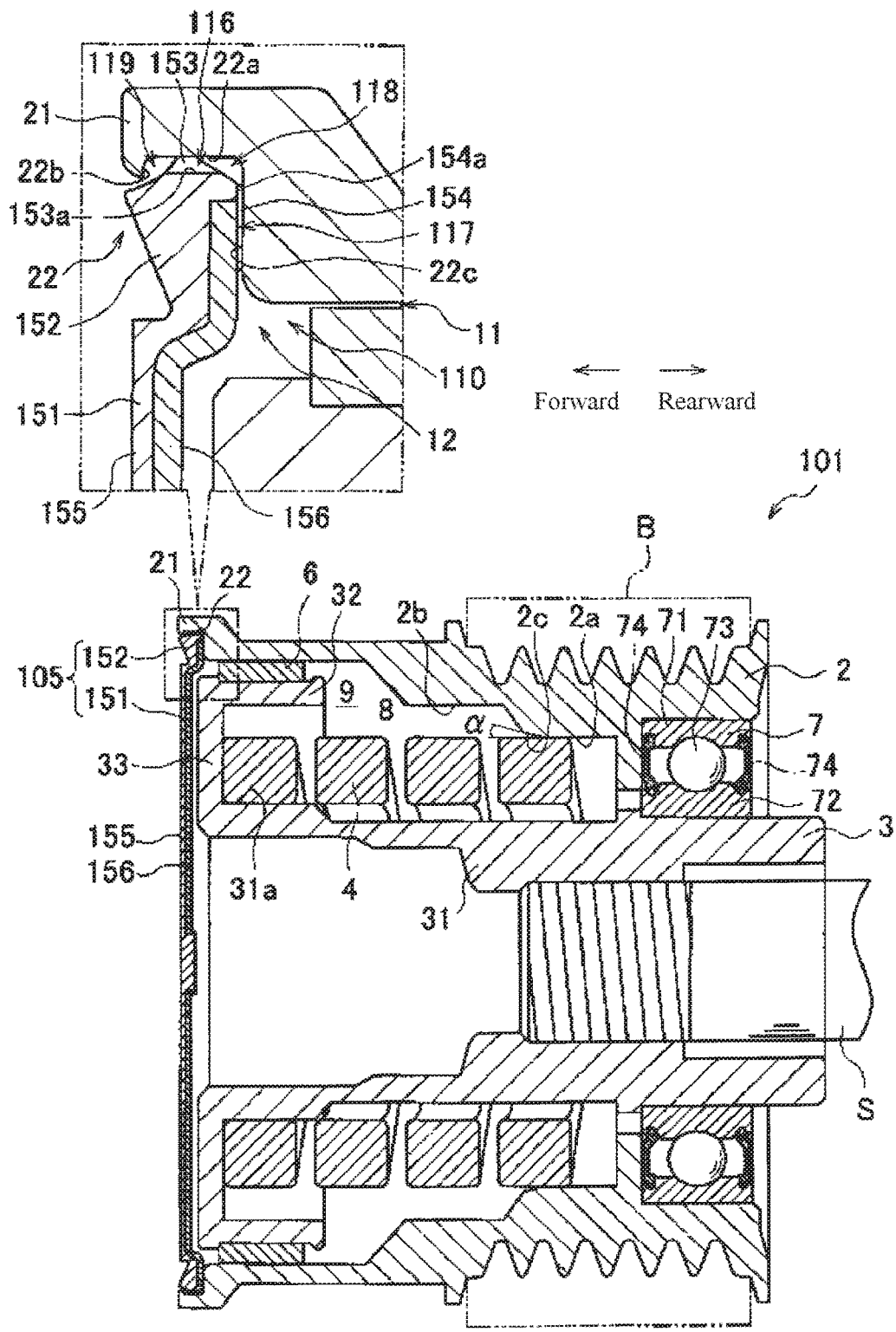

[FIG 6]
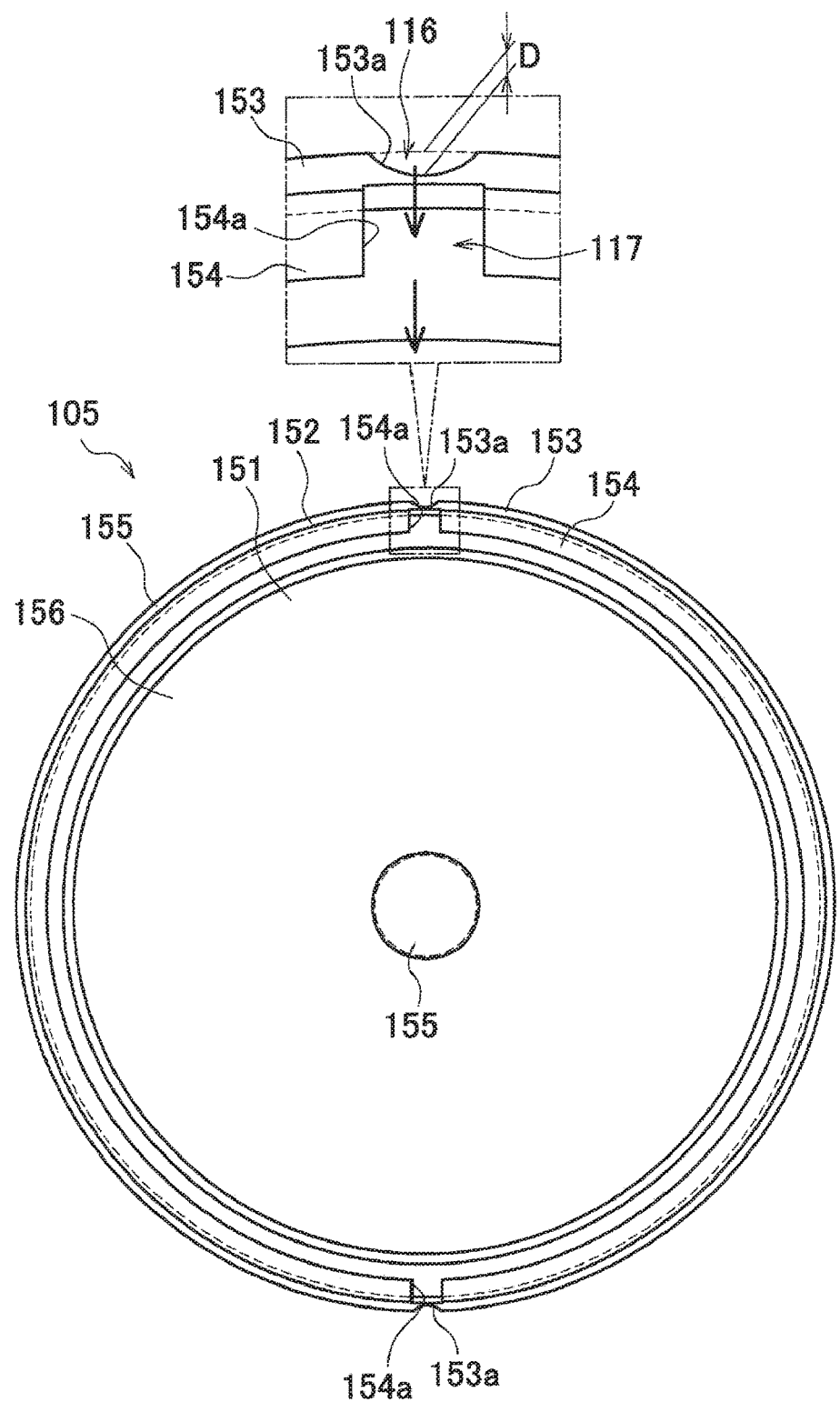

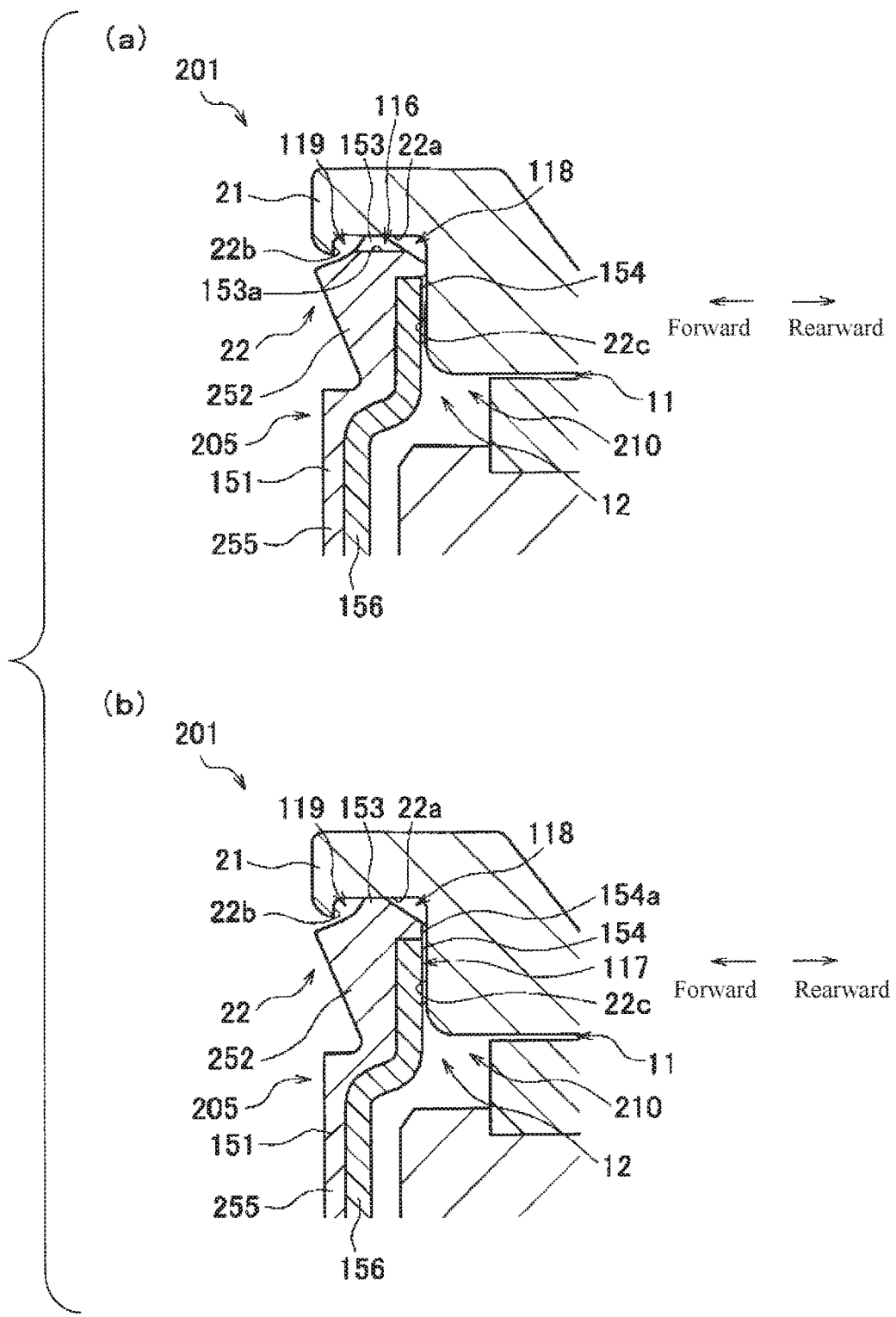
[FIG 7]

[FIG 8]
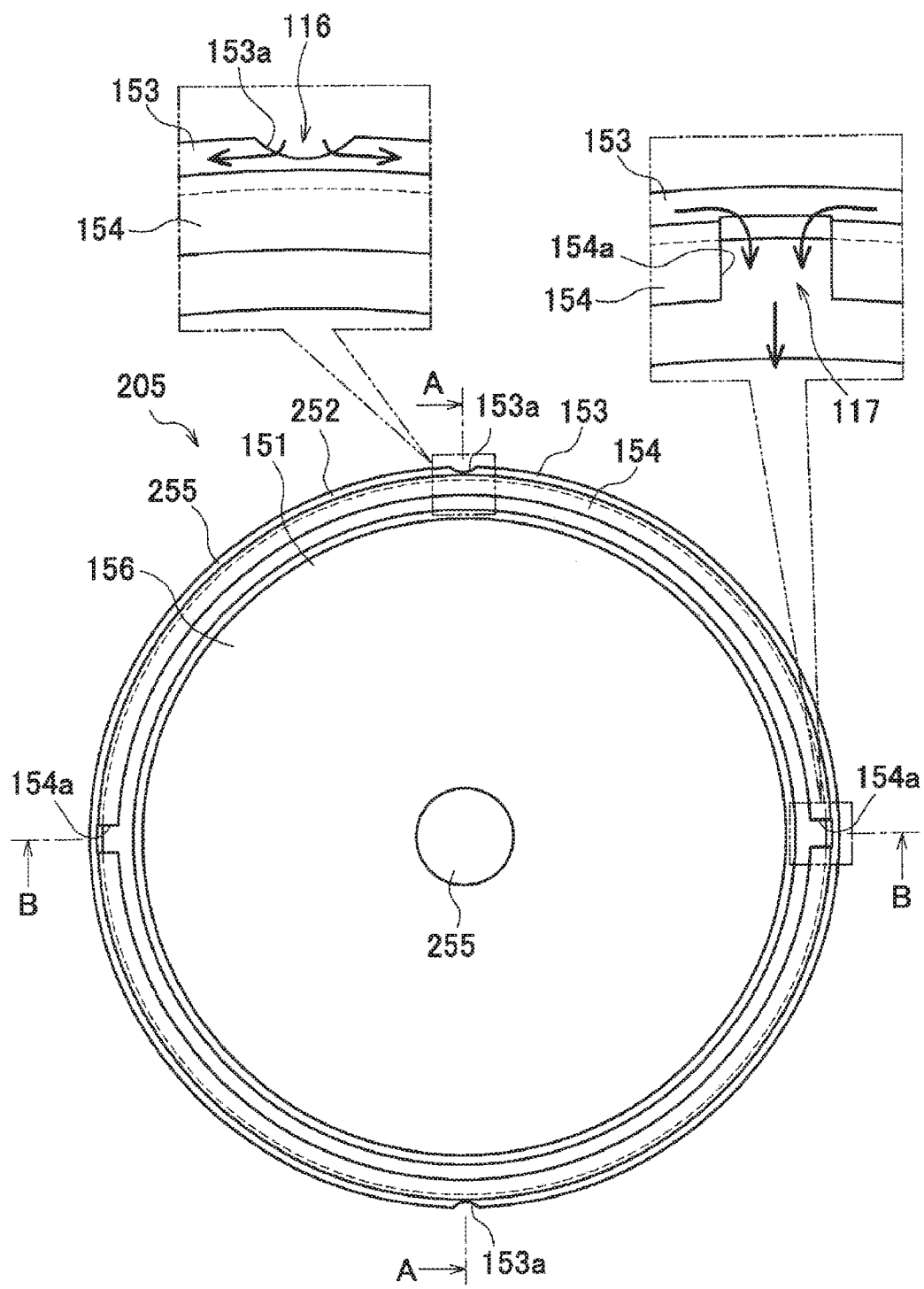

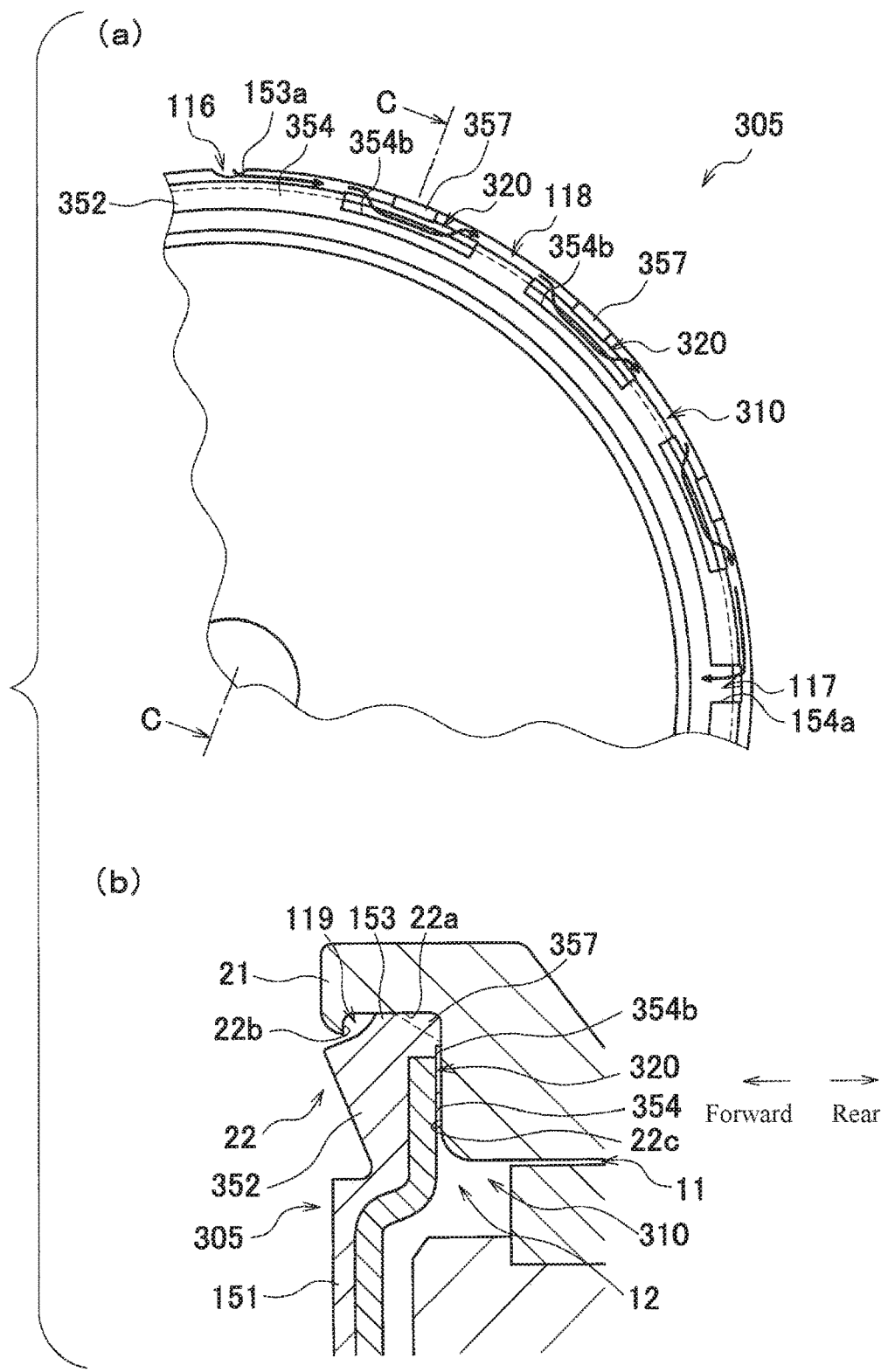
[FIG 9]

[FIG 10]
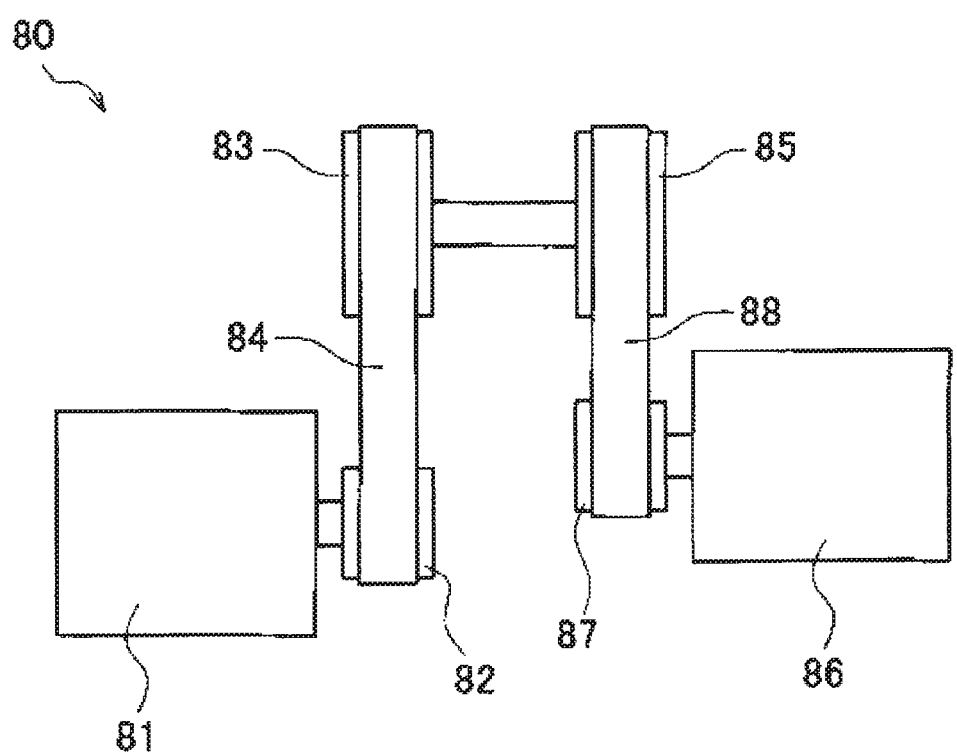

PULLEY STRUCTURE

CROSS REFERENCE TO RELATED APPLICATIONS

This is a U.S. National Phase Application under 35 U.S.C. § 371 of International Application No. PCT/JP2016/054646, filed Feb. 18, 2016, which claims priority to Japanese Application Nos. 2015-031338, filed Feb. 20, 2015 and 2016-011352, filed Jan. 25, 2016, and which was published Under PCT Article 21(2), the entire contents of which are incorporated herein by reference.

TECHNICAL FIELD

The present invention relates to a pulley structure having a spring accommodation space between two rotating bodies that can relatively rotate to each other.

BACKGROUND ART

In an auxiliary machine driving unit of a vehicle or the like, which drives an auxiliary machine such as an alternator by power of an engine, a belt is stretched across a pulley linked to a driving shaft of the auxiliary machine such as an alternator, and a pulley linked to a crankshaft of the engine, and torque of the engine is transmitted to the auxiliary machine via the belt. As the pulley linked to the driving shaft of the auxiliary machine such as an alternator, for example, a pulley structure of Patent Document 1 which can absorb rotation variation of the crankshaft.

The pulley structure disclosed in Patent Document 1 includes a first rotating body around which a belt is wound, a second rotating body that is provided on an inner side of the first rotating body and can relatively rotate with respect to the first rotating body, and a coil spring disposed in a space (hereinafter, referred to as a spring accommodation space) formed between the two rotating bodies. The spring accommodation space is defined by, in addition to the two rotating bodies, an end cap that blocks an opening portion on a front side of the first rotating body and a rolling bearing installed to be interposed between a rear end portion of the first rotating body and the second rotating body.

Generally, as the rolling bearing of the pulley structure provided in the driving shaft of the auxiliary machine such as an alternator, use is made of a contact seal type-sealed ball bearing in which grease (hereinafter, referred to as bearing grease) is sealed. The contact seal type-sealed ball bearing includes an outer wheel, an inner wheel disposed at an inner circumference of the outer wheel, a plurality of balls disposed to be freely rollable between the inner wheel and the outer wheel, and an annular contact seal member disposed on both sides of the plurality of balls. The contact seal member is formed of a rubber-like elastic body and sheet metal. An outer circumferential edge of the contact seal member is fixed to the outer wheel, and a lip portion formed at an inner circumferential edge of the contact seal member comes into contact with a sealing surface of the inner wheel to be pushed and widen. Therefore, the contact seal type-sealed ball bearing has excellent dust resistance and waterproof properties, and the bearing grease can remain for a long period of time.

In the contact seal type-sealed ball bearing, a slight void exists between the lip portion of the contact seal member and the sealing surface of the inner wheel. Friction and wear are caused or deformation is caused by a pressure difference between the inside and the outside of the bearing, pressure due to residual grease that does not contribute to lubricating, or sliding or vibration between the lip portion and the inner wheel. The above-described void is thus generated. As the slight void exists, the contact seal type-sealed ball bearing has a structure into which foreign substances or moisture are unlikely to infiltrate from the outside but allows ventilation.

PRIOR ART DOCUMENT

Patent Document

Patent Document 1: JP-A-2014-114947

SUMMARY OF THE INVENTION

Problems that the Invention is to Solve

In the case where a vehicle or the like travels on a wet road surface, there is a case where muddy water or the like is caught up to the inside of an engine room, and the muddy water or the like adheres to an auxiliary machine driving unit positioned on an engine block side surface. In particular, in the case of traveling on a flooded road surface, the caught-up muddy water can easily reach the auxiliary machine driving unit. With respect to the pulley structure provided in the driving shaft of the auxiliary machine, not only the caught-up muddy water directly adheres, but also the muddy water adheres via the belt from the auxiliary machine.

The end cap of the pulley structure of Patent Document 1 is attached to the first rotating body by utilizing elasticity of a flange portion which is formed of a resin and protrudes in the shaft direction, and by fitting a claw provided in the flange portion to a recessed portion provided at the outer circumference of the first rotating body. Such a fitting portion of the claw and the recessed portion has a poor sealing property. Therefore, in the case where an aqueous medium such as muddy water adheres to a surface of the pulley structure, the aqueous medium is likely to pass through the fitting portion to infiltrate into the pulley structure. As a result, there is a concern that a configuration component which is in contact with a spring accommodation space is subjected to corrosion or foreign substances jamming to cause an operation failure or the like, to thereby shorten a life-time of the pulley structure.

As a method for solving the problem, it is considered using an end cap having a structure that can reliably seal an opening portion of a first rotating body over the entire circumference. However, in the case of employing such an end cap, communication between the spring accommodation space and the outside is blocked, and thus, when the temperature of the spring accommodation space is raised by receiving influence from a heat source such as an engine, the pressure in the spring accommodation space and the pressure on the inside of the rolling bearing are raised.

Accordingly, a difference between the pressure on the inside of the rolling bearing and the pressure in the outer space behind the rolling bearing (auxiliary machine side, such as the alternator) is generated, and in accordance with the pressure difference, the bearing grease passes through the void between the lip portion of the contact seal member and the inner wheel to leak out to the outer space behind the rolling bearing. In addition, when the bearing grease is excessively decreased, the rolling bearing is damaged by burning or the like to finish the life-time of the pulley structure at an early stage.

Here, an object of the present invention is to provide a pulley structure that can prevent an aqueous medium such as muddy water from infiltrating into a spring accommodation space, can prevent grease which fills the inside of a rolling bearing from excessively leaking out due to a pressure difference between the inside and the outside of the pulley structure, and can realize a long life-time of the pulley structure.

Means for Solving the Problems

A first aspect of the pulley structure according to the present invention including: a cylindrical first rotating body around which a belt is wound; a second rotating body provided on an inner side of the first rotating body to be relatively rotatable with respect to the first rotating body; a torsion coil spring accommodated in a spring accommodation space formed between the first rotating body and the second rotating body; an end cap that blocks an opening portion on one side of the first rotating body in a rotating axis direction; a rolling bearing provided to be interposed between the first rotating body and the second rotating body on the other side in the rotating axis direction; and a ventilation path that is formed at a position shifted in a radial direction from the rotating axis of the first rotating body and allows the spring accommodation space and the outside to communicate with each other, in which at least a part of the ventilation path is formed in the end cap, and in which the end cap blocks the opening portion of the first rotating body such that the spring accommodation space communicates with the outside toward the one side in the rotating axis direction only via the ventilation path.

According to this configuration, the end cap blocks the opening portion of the first rotating body such that the spring accommodation space formed between the first rotating body and the second rotating body communicates with the outside toward the one side in the rotating axis direction only via the ventilation path, that is, it blocks the opening portion of the first rotating body such that the spring accommodation space does not communicate with the outside toward the one side in the rotating axis direction via a path other than the ventilation path. Since at least a part of the ventilation path is formed in the end cap, the minimum flow path-sectional area of the ventilation path can be freely set. By reducing the minimum flow path-sectional area of the ventilation path, even when an aqueous medium such as muddy water adheres to the end cap, it is possible to prevent the aqueous medium such as muddy water from infiltrating into the spring accommodation space.

Since the ventilation path is formed at the position shifted in the radial direction from the rotating axis of the first rotating body, the ventilation path formed in the end cap also rotates around the rotation shaft of the first rotating body in accordance with the rotation of the first rotating body. Therefore, even when the aqueous medium such as muddy water adheres to the end cap, due to an action of a centrifugal force, the aqueous medium such as muddy water is unlikely to infiltrate into the ventilation path and foreign substances are unlikely to be jammed in the ventilation path.

In this manner, by preventing the aqueous medium such as muddy water from infiltrating into the spring accommodation space, it is possible to prevent an operation failure or the like caused by corrosion or foreign substances jamming of a configuration component which is in contact with the spring accommodation space, to thereby achieve a long life-time of the pulley structure.

In addition, by ensuring the ventilation between the spring accommodation space and the outside via the ventilation path, even when the temperature of the inner space (including the spring accommodation space and the space on the inside of the rolling bearing) of the pulley structure is raised, it is possible to maintain the balance of the pressure of the inner space of the pulley structure and the outside. Therefore, it is possible to prevent the grease enclosed in the rolling bearing from leaking out to the outside due to the difference between the pressure on the inside and the pressure on the outside of the rolling bearing. Accordingly, it is possible to prevent the rolling bearing from being damaged at an early stage, to thereby achieve a longer life-time of the pulley structure.

In the pulley structure of a second aspect according to the present invention, in the first aspect, the first rotating body has a recessed portion formed on an inner circumferential surface of the opening portion to extend in a circumferential direction, the end cap includes an elastic portion formed of an elastic body and a rigid portion integrated with the elastic portion and having a higher rigidity than that of the elastic portion, the end cap has a seal portion being in contact with the recessed portion of the first rotating body in an outer edge portion, at least the seal portion is formed of the elastic portion, and the outer edge portion of the end cap is fitted to the recessed portion in a state of being compressed in the radial direction.

According to this configuration, in the outer edge portion of the end cap, at least the seal portion, which comes into contact with the recessed portion of the first rotating body, is formed by the elastic portion made of the elastic body, and the outer edge portion of the end cap is fitted to the recessed portion in a state of being compressed in the radial direction. Therefore, since the sealing properties between the seal portion and the recessed portion are high, it is possible to more reliably realize a configuration in which the spring accommodation space does not communicate with the outside toward the one side in the rotating axis direction via a path other than the ventilation path.

In addition, since the end cap has the rigid portion which has a higher rigidity than that of the elastic portion and is integrated with the elastic portion, the rigid portion can suppress deformation of the end cap. Therefore, it is possible to further enhance the sealing properties between the seal portion and the recessed portion.

In the pulley structure of a third aspect according to the present invention, in the second aspect, the ventilation path includes at least one cutout ventilation path formed by cutting out a part of the seal portion of the end cap.

According to this configuration, since the ventilation path includes the cutout ventilation path formed by cutting out a part of the seal portion of the end cap, the ventilation path is formed in the vicinity of the outer edge portion of the end cap. When the first rotating body and the end cap rotate, a moving speed of the aqueous medium such as muddy water, which adheres to an inner side than the outer edge portion of the end cap, increases as it moves to more outer side in the radial direction, due to the action of the centrifugal force. Therefore, the aqueous medium such as muddy water is unlikely to infiltrate into the ventilation path formed in the vicinity of the outer edge portion of the end cap and thus, and it is possible to more reliably prevent the aqueous medium such as muddy water from infiltrating into the spring accommodation space.

Here, "being formed by cutting out" in the present invention includes not only the case of being formed by practically cutting out, but also a case of being formed into a cutout shape by metallic molding or the like.

In the pulley structure of a fourth aspect according to the present invention, in the third aspect, the cutout ventilation path positioned on the one side in the rotating axis direction the most among the at least one cutout ventilation path is covered with the recessed portion when viewed from the one side in the rotating axis direction.

According to this configuration, since the cutout ventilation path positioned on the one side in the rotating axis direction the most among at least one cutout ventilation path is hidden in the inner side of the recessed portion, it is possible to more reliably prevent the aqueous medium such as muddy water, which scatters on the outside of the pulley structure, from directly infiltrating to the cutout ventilation path.

In the pulley structure of a fifth aspect according to the present invention, in the third or fourth aspect, at least a part of the outer edge portion protrudes further to the one side in the rotating axis direction than the recessed portion.

According to this configuration, since at least a part of the outer edge portion further protrudes to the one side in the rotating axis direction than the recessed portion, even when the aqueous medium such as muddy water, which adheres to an inner side than the outer edge portion of the end cap, moves to the outer side in the radial direction due to the action of the centrifugal force, it is unlikely to infiltrate into the recessed portion. Accordingly, it is possible to more reliably prevent the aqueous medium such as muddy water from infiltrating into the spring accommodation space via the ventilation path.

In the pulley structure of a sixth aspect according to the present invention, in any one of the third to fifth aspects, the ventilation path is formed to change its orientation in the middle of reaching the spring accommodation space from a part that extends along a bottom surface of the recessed portion.

According to this configuration, since the ventilation path changes its orientation in the middle of reaching the spring accommodation space from a part that extends along a bottom surface of the recessed portion, even when the aqueous medium such as muddy water infiltrates into the ventilation path from the outside, it is possible to prevent the aqueous medium such as muddy water from easily infiltrating into the spring accommodation space.

In the pulley structure of a seventh aspect according to the present invention, in the sixth aspect, the seal portion includes a first seal portion that is in contact with the bottom surface of the recessed portion and a second seal portion that is in contact with a side surface of the recessed portion on the other side in the rotating axis direction, and the at least one cutout ventilation path includes a first cutout ventilation path formed by cutting out a part of the first seal portion and a second cutout ventilation path formed by cutting out a part of the second seal portion.

According to this configuration, since the first cutout ventilation path extends along the bottom surface of the recessed portion, the ventilation path can realize a configuration in which the orientation changes in the middle of reaching the spring accommodation space from the part that extends along the bottom surface of the recessed portion.

In addition, the seal portion includes the second seal portion which comes into contact with the side surface of the recessed portion on the other side in the rotating axis direction in addition to the first seal portion which comes into contact with the bottom surface of the recessed portion. Therefore, compared to a case where only the first seal portion is provided, it is possible to further improve sealing properties between the seal portion and the recessed portion.

In the pulley structure of an eighth aspect according to the present invention, in any one of the third to the seventh aspects, the ventilation path branches in a plurality of directions in the middle of reaching the spring accommodation space.

According to this configuration, it is possible to more reliably ensure the ventilation between the spring accommodation space and the outside.

In the pulley structure of a ninth aspect according to the present invention, in the second aspect, the ventilation path penetrates a part on more inner side than the outer edge portion of the end cap, and includes a substantially circular hole having a diameter of 0.5 mm or larger and 1.2 mm or smaller.

According to this configuration, by setting the diameter of the substantially circular hole to be 1.2 mm or less, it is possible to more reliably suppress infiltration of the aqueous medium such as muddy water into the substantially circular hole. In addition, by setting the diameter of the substantially circular hole to be 0.5 mm or larger, it is possible to more reliably prevent foreign substances such as dus, from jamming the substantially circular hole.

In the pulley structure of a tenth aspect according to the present invention, in the ninth aspect, the substantially circular hole is formed on more inner side in the radial direction than the spring accommodation space.

According to this configuration, by setting the diameter of the substantially circular hole to be 1.2 mm or less, it is possible to more reliably suppress infiltration of the aqueous medium such as muddy water into the substantially circular hole. In addition, by setting the diameter of the substantially circular hole to be 0.5 mm or larger, it is possible to more reliably prevent foreign substances such as dust, from jamming the substantially circular hole.

BRIEF DESCRIPTION OF DRAWINGS

FIG. 1 is a cross-sectional view of a pulley structure of a first embodiment of the present invention.

FIG. 2 is a cross-sectional view taken along line II-II of FIG. 1.

FIG. 3 is a view when an end cap of FIG. 1 is viewed from the rear part.

FIG. 4 is a graph showing a relationship between a torsion angle and torsion torque of a torsion coil spring of the pulley structure of the first embodiment.

FIG. 5 is a cross-sectional view of a pulley structure of a second embodiment of the present invention.

FIG. 6 is a view when an end cap of FIG. 5 is viewed from the rear part.

FIG. 7 is a partially enlarged cross-sectional view of a pulley structure of a third embodiment of the present invention; (a) of FIG. 7 is a cross-sectional view of the pulley structure when being cut at the same position as A-A line of FIG. 8; and (b) of FIG. 7 is a cross-sectional view of the pulley structure when being cut at the same position as B-B line of FIG. 8.

FIG. 8 is a view when an end cap of FIG. 7 is viewed from the rear part.

FIG. 9 is a view illustrating an end cap employed in a pulley structure of the other embodiment of the present invention; (a) of FIG. 9 is a view when the end cap is viewed from the rear part; and (b) of FIG. 9 is a cross-sectional view of the pulley structure when being cut at the same position as C-C line of (a) of FIG. 9.

FIG. 10 is a view illustrating a configuration of an idle durability testing machine used in tests of Examples.

MODE FOR CARRYING OUT THE INVENTION

First Embodiment

Hereinafter, a pulley structure 1 of a first embodiment of the present invention will be described.

The pulley structure 1 of this embodiment is installed in a driving shaft of an alternator in an auxiliary machine driving system (not illustrated) of a vehicle. The auxiliary machine driving system has a configuration in which a belt stretches over a driving pulley linked to a crankshaft of an engine and a driven pulley that drives an auxiliary machine such as the alternator. As rotation of the crankshaft is transmitted to the driven pulley via the belt, the auxiliary machine such as the alternator is driven. In the crankshaft, a rotational speed varies due to engine combustion, and the speed of the belt also varies in accordance therewith. The pulley structure of the present invention may be installed in a driving shaft of an auxiliary machine other than the alternator.

As illustrated in FIG. 1 and FIG. 2, the pulley structure 1 of this embodiment includes a substantially cylindrical first rotating body (pulley) 2 around which a belt B is wound, a substantially cylindrical second rotating body (hub) 3 disposed on the inner side of the first rotating body 2 with identical rotating axes, a torsion coil spring 4 accommodated in a spring accommodation space 8 formed between the first rotating body 2 and the second rotating body 3, and an end cap 5 disposed on one side in the rotating axis direction of the rotating bodies 2 and 3. In the following description, the leftward direction on the paper surface in FIG. 1 is referred to as a forward direction, and the rightward direction is referred to as a rearward direction. This is also the same both in the second embodiment and in the third embodiment which will be described later.

On an inner circumferential surface of an opening portion 21 at the front side of the first rotating body 2, a recessed portion 22 extending in a circumferential direction is formed. The recessed portion 22 continuously extends over the entire circumference. The recessed portion 22 is formed of a bottom surface 22a and two side surfaces 22b and 22c. The side surface 22b at the front side (hereinafter, there is a case of being called a front side surface 22b) is shorter than the side surface 22c at the rear side (hereinafter, there is a case of being called a rear side surface 22c).

The opening portion 21 at the front side of the first rotating body 2 is blocked by the end cap 5. The end cap 5 is configured of a disk portion 51 facing an inner side of the opening portion 21 of the first rotating body 2, and an outer edge portion 52 on further outer circumferential side than the disk portion 51. The outer edge portion 52 protrudes to further rear side than the disk portion 51. The outer edge portion 52 comes into contact with the bottom surface 22a and the rear side surface 22c of the recessed portion 22. In the outer edge portion 52, a part that comes into contact with the bottom surface 22a of the recessed portion 22 is a first seal portion 53, and a part that comes into contact with the rear side surface 22c of the recessed portion 22 is a second seal portion 54.

The end cap 5 includes an elastic portion 55 made of an elastic body and a rigid portion 56 having higher rigidity than that of the elastic portion 55, which are integrated with each other. Preferable examples of the elastic body forming the elastic portion 55 include a rubber composition containing a rubber constituent such as chloroprene rubber, urethane rubber, nitrile rubber, hydrogenated nitrile rubber, acrylic rubber, silicone rubber, or fluororubber. This is because these types of rubber have excellent oil resistance and heat resistance. The rigid portion 56 is an annular metal plate. Specifically, for example, use can be made of a cold-rolled steel sheet, an electrogalvanized steel sheet, a stainless steel sheet, or an aluminum alloy sheet.

The elastic portion 55 covers the entire front surface of the rigid portion 56. In other words, the entire front surface of the end cap 5 is formed of the elastic portion 55. Accordingly, rust of the end cap 5 can be suppressed. The diameter of the elastic portion 55 is larger than the diameter of the rigid portion 56. Therefore, the first seal portion 53, which is at the outer circumferential end of the outer edge portion 52, is formed by the elastic portion 55. In addition, the elastic portion 55 covers the vicinity of an outer circumferential end of the rear surface of the rigid portion 56, and the second seal portion 54 is formed by the covering part.

The outer edge portion 52 of the end cap 5 is fitted to the recessed portion 22 in a state where the first seal portion 53 is compressed in the radial direction by the bottom surface 22a of the recessed portion 22. Therefore, the opening portion 21 is reliably sealed by the first seal portion 53. In addition, since the second seal portion 54 is not pressed to the recessed portion 22 unlike the first seal portion 53, there is also a case where the second seal portion 54 does not come into contact with the rear side surface 22c of the recessed portion 22.

The thickness of the outer edge portion 52 becomes thick as approaching an outer circumferential side from a boundary part with the disk portion 51, but from a certain position, becomes thin as approaching the outer circumferential end. A front surface of the outer edge portion 52 extends in a direction of being inclined with respect to a rotating axis direction (forward-and-rearward direction) from the outer circumferential end of the outer edge portion 52. The most front end of the outer edge portion 52 is positioned at a further front side than the recessed portion 22. In other words, a part of the outer edge portion 52 protrudes further to the front side than the recessed portion 22.

Since the rigid portion 56 has a substantially annular shape, the vicinity of the center of the end cap 5 in the radial direction is formed only of the elastic portion 55. It is preferable that the part formed only of the elastic portion 55 has the same size as or smaller than an inner space of a front end of a cylindrical main body 31 which will be described later of the second rotating body 3, when viewed in the forward-and-rearward direction. As the vicinity of the center of the end cap 5 is formed only of the elastic portion 55, when performing maintenance work, operation of pulling out the end cap 5 is easily performed. Specifically, by tearing off the elastic portion 55 by using a tool such as a flat-blade screwdriver, and by kneading according to the principle of leverage, it is possible to easily pull out the end cap 5.

As illustrated in FIG. 3, in the disk portion 51 of the end cap 5, a circular hole 51a (which corresponds to a substantially circular hole of the present invention) is formed. The circular hole 51a has substantially completely round shape, but may have substantially circular shape. In addition, in FIG. 3, in order to make it easy to distinguish the elastic portion 55 and the rigid portion 56, dot-hatching is illustrated in the rigid portion 56. The circular hole 51a is formed on more inner side in the radial direction than the front end of the cylindrical main body 31 which will be described later of the second rotating body 3. The circular hole 51a penetrates a part formed only of the elastic portion 55. Therefore, it is possible to easily form the circular hole 51a, and it is also possible to suppress rust of the rigid portion 56. The circular hole 51a is formed at a position shifted from the center of the end cap 5 (i.e., a position shifted from the rotating axes of the rotating bodies 2 and 3). The diameter of the circular hole 51a is 0.5 mm or larger and 1.2 mm or smaller.

As an example of a manufacturing method of the end cap 5, for example, the rigid portion 56 is set in a die as an insert material, the die is closed in this state, then, the inside of the die is filled with a material (unvulcanized rubber) of the elastic portion 55 by using a pressurizing forming machine or an injection molding machine, and vulcanization is performed by heating and pressurizing, to thereby integrally form the elastic portion 55 and the rigid portion 56. After this, the circular hole 51a is processed. In addition, in order to increase adhesion between the rigid portion 56 and the elastic portion 55, in a preprocessing of vulcanization, it is preferable to coat the surface of the rigid portion 56 which is to be in contact with the elastic portion 55 with a vulcanizing adhesive and then dry it.

The second rotating body 3 includes the cylindrical main body 31 fixed to a driving shaft S of an alternator, an outer cylindrical portion 32 disposed on the outer side of the front end portion of the cylindrical main body 31, and an annular plate portion 33 which links the front end of the cylindrical main body 31 and the front end of the outer cylindrical portion 32 to each other. The driving shaft S is fixed with being screwed to a screw groove of the inner circumferential surface of the cylindrical main body 31.

A sliding bearing 6 is installed to be interposed between the inner circumferential surface of the front end portion of the first rotating body 2 and the outer circumferential surface of the outer cylindrical portion 32 of the second rotating body 3. A rolling bearing 7 is installed to be interposed between the inner circumferential surface of the rear end portion of the first rotating body 2 and the outer circumferential surface of the cylindrical main body 31 of the second rotating body 3. The first rotating body 2 and the second rotating body 3 are linked to each other to be relatively rotatable by the two bearings 6 and 7. The first rotating body 2 and the second rotating body 3 rotate in an arrow direction (clockwise when viewed from the front side) of FIG. 2.

The sliding bearing 6 is a C-shaped member which is formed of, for example, a synthetic resin such as a polyacetal resin or a polyamide resin, and has elasticity. The sliding bearing 6 is mounted on the outer cylindrical portion 32 of the second rotating body 3 in a state where the diameter is slightly expanded, and tightly adheres to the outer cylindrical portion 32 by an elastic restoring force of itself. On each side of the sliding bearing 6 of the outer cylindrical portion 32, a projection which prevents the sliding bearing 6 from falling off is provided. The sliding bearing 6 can finely move in an axis direction between these two projections. A void 11 exists between the sliding bearing 6 and the inner circumferential surface of the first rotating body 2. The size of the void 11 is, for example, approximately 0.1 mm. When driving the pulley structure 1, a rust-preventive agent (not illustrated) which will be described later exists in the void 11. The rust-preventive agent does not completely block the void 11, and the air can pass through the void 11.

The rolling bearing 7 is contact seal type-sealed ball bearing. The rolling bearing 7 includes an outer wheel 71 fixed to the inner circumferential surface of the first rotating body 2, an inner wheel 72 fixed to the outer circumferential surface of the cylindrical main body 31 of the second rotating body 3, a plurality of balls 73 disposed to be freely rollable between the outer wheel 71 and the inner wheel 72, and annular contact seal members 74 disposed on both sides of the plurality of balls 73. Although not being illustrated, a holding portion that holds the ball 73 to be freely slidable is provided in the outer wheel 71 and the inner wheel 72. The contact seal member 74 is formed of a rubber-like elastic body and sheet metal. The outer circumferential edge of the contact seal member 74 is fixed to the outer wheel 71, and a lip portion formed at the inner circumferential edge of the contact seal member 74 comes into contact with a sealing surface of the inner wheel 72 to be pushed and widen.

The inside of the rolling bearing 7 is filled with bearing grease (not illustrated). The bearing grease forms excellent oil film in a contact portion between the holding portion of the outer wheel 71 and the inner wheel 72 and each of the balls 73, and contributes to ensuring a rolling fatigue lifetime of the holding portion. Base oil of the bearing grease is, for example, synthetic oil such as ester oil, and has a kinematic viscosity of preferably approximately 100 mm$^2$/s at 40° C. (test method is based on ASTM D7042-14:2014). As a thickening agent of bearing grease, for example, a urea compound having excellent heat resistance is used. Examples of the urea compound include a diurea compound, a triurea compound, a tetraurea compound, a polyurea compound, a urea/urethane compound, a diurethane compound, or a mixture of them. The blending ratio of the thickening agent is preferably 5% to 40% by weight with respect to the entire amount of grease. In the case where the blending ratio of the thickening agent is less than 5% by weight, it becomes difficult to maintain the state of grease, and in the case where it exceeds 40% by weight, the grease becomes excessively hard and cannot sufficiently achieve a lubricating state, which are not preferable.

The spring accommodation space 8 is formed in a front side than the rolling bearing 7 and between the first rotating body 2 and the second rotating body 3. The torsion coil spring 4 is accommodated in the spring accommodation space 8. The spring accommodation space 8 is a space divided by the inner circumferential surface of the first rotating body 2, the outer circumferential surface of the cylindrical main body 31 of the second rotating body 3, the rolling bearing 7, and the annular plate portion 33 of the second rotating body 3. In addition, the spring accommodation space 8, the void 11 between the sliding bearing 6 and the inner circumferential surface of the first rotating body 2, and the space on the inside of the rolling bearing 7 are collectively called as an inner space 9 of the pulley structure 1.

The spring accommodation space 8 communicates with the outside of the pulley structure 1 through the void 11 between the sliding bearing 6 and the inner circumferential surface of the first rotating body 2, a void 12 between the outer circumferential surface of the outer cylindrical portion 32 of the second rotating body 3 and the inner circumferential surface of the first rotating body 2 on a front side of the void 11, a void 13 between the front surface of the second rotating body 3 and the end cap 5, a void 14 between the front end surface of the driving shaft S and the end cap 5, and the circular hole 51a of the end cap 5. The above-described path which reaches the outside from the spring accommodation space 8 is a ventilation path 10. The ventilation path 10 is formed at a position shifted in the radial direction from the rotating axis of the first rotating body 2.

A material of the first rotating body 2 and the second rotating body 3 is metal, and for example, a carbon steel material such as S45C can be used. Surface treatment (surface hardening treatment) of increasing surface hardness, such as soft-nitriding treatment or high frequency hardening, may be performed with respect to the inner surface of the first rotating body 2.

In the spring accommodation space 8, the inner diameter of the first rotating body 2 becomes smaller in two stages as approaching a rear side. An inner circumferential surface at a part having the smallest inner diameter is a pressure contact surface 2a, and an inner circumferential surface at a part having the second smallest inner diameter is an annular surface 2b. The diameter of the annular surface 2b is the same as or larger than the inner diameter of the outer cylindrical portion 32 of the second rotating body 3. An edge portion in the front side of the pressure contact surface 2a is chamfered in a tapered shape over the entire circumference. This chamfering portion 2c has an inclined angle α with respect to the forward-and-rearward direction (rotating axis direction) of preferably from 10° to 20°, and more preferably 15°. In addition, the cylindrical main body 31 of the second rotating body 3 has a larger outer diameter at the front end portion than that at the other part thereof in the spring accommodation space 8. The outer circumferential surface of this part is a contact surface 31a.

As illustrated in FIG. 2, at the front end portion of the second rotating body 3, an abutting surface 3a opposing a front end surface 4a of the torsion coil spring 4 in the circumferential direction is formed. The abutting surface 3a is formed in an arc shape when viewed in the axis direction. In addition, on the inner circumferential surface of the outer cylindrical portion 32, a projection portion 32a protruding toward the inner side in the radial direction is provided. The projection portion 32a is formed at a position separated by approximately 90° on a side opposite to the rotating direction (arrow direction in FIG. 2) from the abutting surface 3a. The projection portion 32a opposes the outer circumferential surface on a front side region of the torsion coil spring 4.

The torsion coil spring 4 is formed of a wire material having a rectangular cross-section. As the wire material of the torsion coil spring 4, for example, an oil tempered wire for spring (based on JISG3560:1994) can be used. The torsion coil spring 4 is left-handed (counterclockwise toward the tip end in the axis direction). The torsion coil spring 4 has a constant diameter over the entire length in a state of receiving no external force. The outer diameter of the torsion coil spring 4 in a state of receiving no external force is larger than the inner diameter of the pressure contact surface 2a of the first rotating body 2.

The rear side region of the torsion coil spring 4 abuts against the pressure contact surface 2a of the first rotating body 2 in a state where the diameter is reduced. In other words, the outer circumferential surface of the rear side region of the torsion coil spring 4 is pressed to the pressure contact surface 2a of the first rotating body 2 by the elastic restoring force of the torsion coil spring 4 of itself.

In a state where the pulley structure 1 is in a stopped state and the outer circumferential surface of the rear side region of the torsion coil spring 4 is pressed to the pressure contact surface 2a by the elastic restoring force of itself, the front side region of the torsion coil spring 4 abuts against the contact surface 31a of the second rotating body 3 in a state where the diameter slightly expands. In other words, the inner circumferential surface of the front side region of the torsion coil spring 4 is pressed to the contact surface 31a of the second rotating body 3 by the elastic restoring force of the torsion coil spring 4 of itself.

In a state where the inner circumferential surface of the front side region of the torsion coil spring 4 comes into contact with the contact surface 31a, a void is formed between the outer circumferential surface of the front side region of the torsion coil spring 4 and the inner circumferential surface of the outer cylindrical portion 32 of the second rotating body 3. In addition, a void is formed between the annular surface 2b of the first rotating body 2 and the outer circumferential surface of the torsion coil spring 4. In the present embodiment, in a state where the pulley structure 1 is in a stopped state, as illustrated in FIG. 2, a void is formed between the outer circumferential surface of the torsion coil spring 4 and the projection portion 32a, but the outer circumferential surface of the torsion coil spring 4 and the projection portion 32a may be in contact with each other.

The spring accommodation space 8 is filled with a rust-preventive agent. Grease is used as the rust-preventive agent. Specifically, the same grease as bearing grease that is enclosed in the rolling bearing 7 may be used. The rust-preventive agent is introduced into the spring accommodation space 8 in a state of a paste-like mass when assembling the pulley structure 1. The amount introduced is, for example, approximately 0.2 g. When operating the pulley structure 1, due to an increase in temperature of the spring accommodation space 8 or shear heat generation (frictional heat), viscosity of the rust-preventive agent decreases and the rust-preventive agent diffuses to the entire spring accommodation space 8. The rust-preventive agent infiltrates to the void 11 between the sliding bearing 6 and the first rotating body 2, but rarely leaks out to the front side than the void 11.

Next, the operation of the pulley structure 1 will be described.

First, a case where the rotational speed of the first rotating body 2 becomes higher than the rotational speed of the second rotating body 3, that is, a case where the first rotating body 2 accelerates, will be described. In this case, the first rotating body 2 relatively rotates in the same direction as the rotating direction (arrow direction of FIG. 2) with respect to the second rotating body 3.

In accordance with the relative rotation of the first rotating body 2, the rear side region of the torsion coil spring 4 relatively rotates together with the pressure contact surface 2a of the first rotating body 2 with respect to the second rotating body 3. Accordingly, the torsion coil spring 4 is twisted in the diameter expanding direction. A pressure contact force of the rear side region of the torsion coil spring 4 with respect to the pressure contact surface 2a increases as the torsion angle of the torsion coil spring 4 increases.

Here, in the region (front side region) of the torsion coil spring 4, which comes into contact with the contact surface 31a, the vicinity of the position separated by 90° around the rotating axis from the front end surface 4a is a second region 4b2, a part further on the front end surface 4a side than the second region 4b2 is a first region 4b1, and a remaining part is a third region 4b3.

Since the vicinity of the position separated by 90° around the rotating axis from the front end surface 4a of the torsion coil spring 4 (second region 4b2) is likely to receive torsion stress the most, when the torsion angle increases, the second region 4b2 of the torsion coil spring 4 is separated from the contact surface 31a. At this time, the first region 4b1 and the third region 4b3 are pressure-contacted to the contact surface 31a. Substantially at the same time when the second region 4b2 is separated from the contact surface 31a, or when the torsion angle further increases, the outer circumferential surface of the second region 4b2 abuts against the projection portion 32a.

As the outer circumferential surface of the second region 4b2 abuts against the projection portion 32a, diameter expansion deformation of the front side region of the torsion coil spring 4 is regulated (suppressed), and thus, the torsion stress is diffused to a winding portion other than the front side region. In particular, the torsion stress applied to the winding portion on the rear side of the torsion coil spring 4 increases. Accordingly, it is possible to reduce a difference in torsion stress applied to each of the winding portions of the torsion coil spring 4, and to absorb strain energy in the entire torsion coil spring 4, and thus, it is possible to prevent local fatigue fracture.

In addition, the pressure contact force of the third region 4b3 with respect to the contact surface 31a decreases as the torsion angle increases. At the same time when the second region 4b2 abuts against the projection portion 32a, or when the torsion angle further increases, the pressure contact force of the third region 4b3 with respect to the contact surface 31a becomes substantially zero. The torsion angle at this time is set to be an angle θ1 (for example, θ1=3°).

When the torsion angle of the torsion coil spring 4 in the diameter expanding direction exceeds the angle θ1, the third region 4b3 is separated from the contact surface 31a by the diameter expansion deformation of the third region 4b3, but in the vicinity of the boundary between the third region 4b3 and the second region 4b2, that is, in the vicinity of the end portion far from the abutting surface 3a of the projection portion 32a, the torsion coil spring 4 does not bend (curved), and the front side region is maintained in an arc shape. In other words, the front side region is maintained to have a shape which is easy to slide the projection portion 32a. Therefore, when the torsion angle increases and the torsion stress applied to the front side region increases, the front side region of the torsion coil spring 4 moves in the circumferential direction (slides the projection portion 32a and the contact surface 31a) against the pressure contact force of the second region 4b2 with respect to the projection portion 32a and the pressure contact force of the first region 4b1 with respect to the contact surface 31a, and the front end surface 4a of the torsion coil spring 4 pressurizes the abutting surface 3a of the second rotating body 3. As the front end surface 4a pressurizes the abutting surface 3a, it is possible to reliably transmit torque between the two rotating bodies 2 and 3.

In this manner, in the case where the torsion angle of the torsion coil spring 4 in the diameter expanding direction is the angle θ1 or larger (less than an angle θ2), in the front side region of the torsion coil spring 4, the third region 4b3 is separated from the contact surface 31a (and does not come into contact with the inner circumferential surface of the outer cylindrical portion 32) and the second region 4b2 is pressure-contacted to the projection portion 32a, and thus, compared to a case where the torsion angle is less than θ1, the number of active coils of the torsion coil spring 4 increases. The number of active coils of the coil spring is the number of windings of a range excluding the part at which the spring is fixed from the entire spring length, and is reversely proportional to a spring constant (torsion torque/torsion angle). Here, FIG. 4 is a graph showing a relationship between the torsion angle and the torsion torque of the torsion coil spring 4. When the torsion angle in the diameter expanding direction exceeds the angle θ1, as the number of active coils increases, as illustrated in FIG. 4, the spring constant (inclination of a straight line illustrated in FIG. 4) decreases.

When the torsion angle of the torsion coil spring 4 in the diameter expanding direction reaches the predetermined angle θ2 (e.g., 45°), the outer circumferential surface of a middle region (a region between the front side region and the rear side region) of the torsion coil spring 4 abuts against the annular surface 2b of the first rotating body 2, or as the torsion angle reaches a limit angle, a further diameter expansion deformation of the torsion coil spring 4 is regulated, and the first rotating body 2 and the second rotating body 3 integrally rotate. Accordingly, it is possible to prevent damage of the torsion coil spring 4 by the diameter expansion deformation.

Next, a case where the rotational speed of the first rotating body 2 becomes lower than the rotational speed of the second rotating body 3, that is, a case where the first rotating body 2 decelerates will be described. In this case, the first rotating body 2 relatively rotates in the direction reverse to the rotating direction (arrow direction of FIG. 2) with respect to the second rotating body 3.

Since the rear side region of the torsion coil spring 4 relatively rotates together with the pressure contact surface 2a of the first rotating body 2 with respect to the second rotating body 3 in accordance with the relative rotation of the first rotating body 2, the torsion coil spring 4 is twisted in the diameter reducing direction.

In a case where the torsion angle of the torsion coil spring 4 in the diameter reducing direction is less than a predetermined angle θ3 (e.g., θ3=10°), the pressure contact force of the rear side region of the torsion coil spring 4 with respect to the pressure contact surface 2a slightly deteriorates as compared to a case where the torsion angle is zero, the rear side region of the torsion coil spring 4 is pressure-contacted to the pressure contact surface 2a. In addition, the pressure contact force of the front side region of the torsion coil spring 4 with respect to the contact surface 31a slightly increases as compared to a case where the torsion angle is zero.

In a case where the torsion angle of the torsion coil spring 4 in the diameter reducing direction is the angle θ3 or larger, the pressure contact force of the rear side region of the torsion coil spring 4 with respect to the pressure contact surface 2a becomes substantially zero, and the rear side region of the torsion coil spring 4 slides the pressure contact surface 2a in the circumferential direction. Therefore, the torque is not transmitted between the two rotating bodies 2 and 3.

The pulley structure 1 of the present embodiment described above has the following characteristics.

The end cap 5 blocks the opening portion 21 of the first rotating body 2 such that the spring accommodation space 8 formed between the first rotating body 2 and the second rotating body 3 communicates with the outside toward the front side only via the ventilation path 10, that is, it blocks the opening portion 21 of the first rotating body 2 such that the spring accommodation space 8 does not communicate with the outside toward the front side via a path other than the ventilation path 10. Since the circular hole 51a that is a part of the ventilation path 10 is formed in the end cap 5, the minimum flow path-sectional area of the ventilation path 10 can be freely set. By reducing the minimum flow path-sectional area of the ventilation path 10, even when the aqueous medium such as muddy water adheres to the end cap 5, it is possible to prevent the aqueous medium such as muddy water from infiltrating into the spring accommodation space 8.

In addition, since the ventilation path 10 is formed at the position shifted in the radial direction from the rotating axis of the first rotating body 2, the ventilation path 10 (circular hole 51a) formed in the end cap 5 also rotates around the rotating axis of the first rotating body 2 in accordance with the rotating of the first rotating body 2. Therefore, even when the aqueous medium such as muddy water adheres to the end cap 5, due to the action of the centrifugal force, the aqueous medium such as muddy water is unlikely to infiltrate into the ventilation path 10 (specifically, circular hole 51a) and the foreign substances is unlikely to be jammed in the ventilation path 10.

In this manner, by preventing the aqueous medium such as muddy water from infiltrating into the spring accommodation space 8, it is possible to prevent an operation failure or the like caused by corrosion or foreign substances jamming of a configuration component which is in contact with the spring accommodation space 8, to thereby achieve a long life-time of the pulley structure 1.

In addition, by ensuring ventilation between the spring accommodation space 8 and the outside via the ventilation path 10, even when the temperature of the inner space 9 of the pulley structure 1 is raised, it is possible to keep the balance of pressure between the inner space 9 of the pulley structure 1 and the outside. Therefore, it is possible to prevent the bearing grease enclosed in the rolling bearing 7 from leaking to the outside due to the difference between the pressure on the inside and the pressure on the outside of the rolling bearing 7. Accordingly, it is possible to prevent the rolling bearing 7 from being damaged at early stage, to thereby achieve a longer life-time of the pulley structure 1.

In the outer edge portion 52 of the end cap 5, at least the first seal portion 53 and the second seal portion 54 which come into contact with the recessed portion 22 of the first rotating body 2 are formed by the elastic portion 55 made of an elastic body, and the outer edge portion 52 of the end cap 5 is fitted to the recessed portion 22 in a state of being compressed in the radial direction. Therefore, since the sealing properties between the first seal portion 53 and the recessed portion 22 are high, it is possible to realize a configuration in which the spring accommodation space 8 does not communicate with the outside toward the front side via a path other than the ventilation path 10.

Since the end cap 5 has the rigid portion 56 that has higher rigidity than that of the elastic portion 55 and is integrated with the elastic portion 55, the rigid portion 56 can suppress deformation of the end cap 5. Therefore, it is possible to further enhance the sealing properties between the first seal portion 53 and the second seal portion 54, and the recessed portion 22.

In addition to the first seal portion 53 that comes into contact with the bottom surface 22a of the recessed portion 22, the outer edge portion 52 of the end cap 5 has the second seal portion 54 that comes into contact with the rear side surface 22c of the recessed portion 22. Therefore, as compared to a case where only the first seal portion 53 is provided, it is possible to further enhance the sealing properties between the outer edge portion 52 and the recessed portion 22.

Since the diameter of the circular hole 51a is 1.2 mm or less, it is possible to suppress infiltration of the aqueous medium such as muddy water into the circular hole 51a. In addition, since the diameter of the circular hole 51a is 0.5 mm or larger, it is possible to prevent the foreign substances such as dust from jamming the circular hole 51a.

The circular hole 51a is formed on more inner side in the radial direction than the spring accommodation space 8, and the circular hole 51a is separated from the spring accommodation space 8 in the radial direction. Therefore, even when the aqueous medium such as muddy water infiltrates into the circular hole 51a, the aqueous medium such as muddy water is unlikely to infiltrate into the spring accommodation space 8.

In the present embodiment, the tapered chamfering portion 2c is formed in the edge portion in the front side of the pressure contact surface 2a. If a chamfering (e.g., C 0.3 mm) to the extent not to serve as an edge is performed with respect to the edge portion of the pressure contact surface 2a, the surface pressure due to the pressure contact force of the torsion coil spring 4 is concentrated in this edge portion and thus, there is a concern that the edge portion is worn out at an early stage to deteriorate durability of the pulley structure 1. Meanwhile, in the present embodiment, by forming the tapered chamfering portion 2c in the edge portion of the pressure contact surface 2a, it is possible to reduce the surface pressure due to the pressure contact force of the torsion coil spring 4 in the edge portion. More specifically, it is possible to further reduce the surface pressure at both of the front and rear ends at which the surface pressure becomes the highest in the chamfering portion 2c, to be lower than the surface pressure on the chamfering portion to the extent not to serve as an edge. In addition, by setting the tapered angle of the chamfering portion 2c to be from 10° to 20°, it is possible to further reduce the surface pressure at both of the front and rear ends of the chamfering portion 2c, and in particular, to reduce the surface pressure to the minimum by setting the taper angle to be 15°.

In the case where the surface hardening treatment is performed with respect to the inner surface of the first rotating body 2, it is possible to improve wear resistance of the pressure contact surface 2a which slides the outer circumferential surface of the torsion coil spring 4, to thereby improve durability of the pulley structure 1.

In the present embodiment, the rust-preventive agent is enclosed in the spring accommodation space 8. Therefore, even when moisture containing salt contents enters in the spring accommodation space 8 from the outside through the ventilation path 10 and/or the slight void between the contact seal member 74 and the inner wheel 72 of the rolling bearing 7, it is possible to prevent corrosion of a part of the rotating bodies 2 and 3 which faces the spring accommodation space 8, particularly, a part that is to be in contact with the torsion coil spring 4. In addition, rust is not generated in the torsion coil spring 4 in the case where it is formed of the above-described oil tempered wire, but in a case where it is formed of a material in which rust is generated, it is also possible to prevent rust of the torsion coil spring 4 by the rust-preventive agent.

Second Embodiment

Next, a pulley structure 101 of a second embodiment of the present invention will be described. Configurations similar to those of the above-described first embodiment will be given the same reference numerals, and the description thereof will be omitted appropriately. As illustrated in FIG. 5 and FIG. 6, in the pulley structure 101 of this embodiment, the shape of an end cap 105 is different from that of the end cap 5 of the first embodiment, and the other configuration is the same as that of the first embodiment.

In the end cap 105 of this embodiment, an elastic portion 155 and a rigid portion 156 are integrally formed with each other. The materials of the elastic portion 155 and the rigid portion 156 are the same as that of the elastic portion 55 and the rigid portion 56 of the first embodiment. The end cap 105 is configured of a disk portion 151 and an outer edge portion 152. The disk portion 151 has the same configuration as that of the disk portion 51 of the first embodiment except that the circular hole 51a is not provided.

The outer edge portion 152 includes a first seal portion 153 that comes into contact with the bottom surface 22a of the recessed portion 22, and a second seal portion 154 that comes into contact with the rear side surface 22c of the recessed portion 22. In the first seal portion 153, a first cutout 153a obtained by cutting out a part of the first seal portion 153 in the circumferential direction is formed. In the second seal portion 154, a second cutout 154a obtained by cutting out a part of the second seal portion 154 in the circumferential direction is formed. Here, the "cutting out" includes not only a case of practically cutting out, but also a case of forming a cut-out shape by metallic molding or the like. The outer edge portion 152 has the same configuration as that of the outer edge portion 52 of the first embodiment except that the cutouts 153a and 154a are formed in the first seal portion 153 and the second seal portion 154.

The first cutouts 153a are formed in the first seal portion 153 at two locations separated by 180°. The first cutout 153a extends to be substantially parallel to the rotating axis direction (forward-and-rearward direction). As illustrated in FIG. 6, the first cutout 153a has a cross-section orthogonal to the rotating axis direction being formed in a substantially arc shape. By compressing and fitting the outer edge portion 152 to the recessed portion 22, a cutout depth D (the length in the radial direction from the outermost line of the first seal portion 153 to the bottom of the first cutout 153a) of the first cutout 153a becomes shorter as compared to that before the fitting, and the cross-sectional shape of the first cutout 153a becomes close to a triangular shape.

A first cutout ventilation path 116 is formed between the first cutout 153a and the bottom surface 22a of the recessed portion 22. That is, the first cutout ventilation path 116 is formed by cutting out a part of the first seal portion 153. The first cutout ventilation path 116 extends along the bottom surface 22a of the recessed portion 22, and allows the front side space than the first seal portion 153 and the rear side space to communicate with each other. The width (length in the circumferential direction) of the first cutout 153a is set to be capable of ensuring the ventilation properties, and to be capable of ensuring the fitting strength between the first seal portion 153 and the bottom surface 22a of the recessed portion 22. The flow path-sectional area of the first cutout ventilation path 116 is set to be capable of ensuring the ventilation properties, and to make it difficult for the aqueous medium such as muddy water to infiltrate. The flow path-sectional area of the first cutout ventilation path 116 is, for example, 0.02 mm$^2$ or lager and 0.3 mm$^2$ or smaller. In the state where the outer edge portion 152 is compressed and fitted to the recessed portion 22, the cutout depth D of the first cutout 153a is preferably smaller (e.g., 0.1 mm or larger and 0.3 mm or smaller) than the length of the front side surface 22b of the recessed portion 22 in the radial direction (e.g., 0.4 mm). Accordingly, when viewed from the front side, the front end of the first cutout ventilation path 116 is covered with the front side surface 22b.

The second cutouts 154a are formed in the second seal portion 154 at two locations separated by 180°. The two second cutouts 154a are formed at the same position as the two first cutouts 153a in the circumferential direction. The second cutout 154a extends in the radial direction. The second cutout 154a is formed by cutting out the elastic portion 155 of the second seal portion 154 to expose the rigid portion 156. The second cutout 154a has a cross-section orthogonal to the extending direction (radial direction) being formed, for example, in a substantially rectangular shape or in a substantially arc shape.

A second cutout ventilation path 117 is formed between the second cutout 154a and the rear side surface 22c of the recessed portion 22. That is, the second cutout ventilation path 117 is formed by cutting out a part of the second seal portion 154. The second cutout 154a allows the space on more outer side in the radial direction than the second seal portion 154 and the space on the inner side in the radial direction to communicate with each other. The flow path-sectional area of the second cutout ventilation path 117 may be within a range (e.g., approximately 0.03 mm$^2$) that can ensure ventilation properties regardless of the flow path-sectional area of the first cutout ventilation path 116.

In the rear side of the contact portion between the first seal portion 153 and the bottom surface 22a of the recessed portion 22 and in more outer side in the radial direction than the contact portion between the second seal portion 154 and the rear side surface 22c of the recessed portion 22, a void 118 is formed between the outer edge portion 152 and the recessed portion 22 (specifically, the bottom surface 22a and the rear side surface 22c). In addition, in the front side of the contact portion between the first seal portion 153 and the bottom surface 22a of the recessed portion 22, a void 119 is formed between the outer edge portion 152 and the recessed portion 22 (specifically, the bottom surface 22a and the front side surface 22b). The void 118 and the void 119 continuously extend over the entire circumference.

The spring accommodation space 8 communicates with the outside of the pulley structure 101 via the void 11 between the sliding bearing 6 and the inner circumferential surface of the first rotating body 2, the void 12 between the outer circumferential surface of the outer cylindrical portion 32 of the second rotating body 3 and the inner circumferential surface of the first rotating body 2 on a front side of the void 11, two second cutout ventilation paths 117, the void 118, two first cutout ventilation paths 116, and the void 119. The above-described path which reaches the outside from the spring accommodation space 8 is a ventilation path 110. In FIG. 6, a flow of the air toward the spring accommodation space 8 from the outside is illustrated by a thick-lined arrow. The ventilation path 110 is formed at the position shifted in the radial direction from the rotating axis of the first rotating body 2. The ventilation path 110 changes the orientation toward the inside in the radial direction from the axis direction while reaching the second cutout ventilation path 117 via the void 118 from the first cutout ventilation path 116.

The pulley structure 101 of this embodiment has the following characteristics.

The end cap 105 blocks the opening portion 21 of the first rotating body 2 such that the spring accommodation space 8 formed between the first rotating body 2 and the second rotating body 3 communicates with the outside toward the front side only via the ventilation path 110, that is, it blocks the opening portion 21 of the first rotating body 2 not to communicate with the outside toward the front side via a path other than the ventilation path 110. Since the cutout ventilation paths 116 and 117 which are a part of the ventilation path 110 are formed in the end cap 105, the minimum flow path-sectional area of the ventilation path 110 can be freely set. By reducing the minimum flow path-sectional area of the ventilation path 110, even when the aqueous medium such as muddy water adheres to the end cap 105, it is possible to prevent the aqueous medium such as muddy water from infiltrating into the spring accommodation space 8.

In addition, since the ventilation path 110 is formed at the position shifted in the radial direction from the rotating axis of the first rotating body 2, the ventilation path 110 formed in the end cap 105 also rotates around the rotating axis of the first rotating body 2 in accordance with the rotating of the first rotating body 2. Therefore, even when the aqueous medium such as muddy water adheres to the end cap 105, due to an action of the centrifugal force, the aqueous medium such as muddy water is unlikely to infiltrate into the ventilation path 110 and foreign substances is unlikely to be jammed in the ventilation path 110.

In this manner, by preventing the aqueous medium such as muddy water from infiltrating into the spring accommodation space 8, it is possible to prevent an operation failure or the like caused by corrosion or foreign substances jamming of the configuration component which is in contact with the spring accommodation space 8, to thereby achieve a long life-time of the pulley structure 101.

In addition, by ensuring the ventilation between the spring accommodation space 8 and the outside via the ventilation path 110, even when the temperature of the inner space 9 of the pulley structure 101 is raised, it is possible to keep the balance of pressure between the inner space 9 of the pulley structure 101 and the outside. Therefore, it is possible to prevent the bearing grease enclosed in the rolling bearing 7 from leaking to the outside due to the difference between the pressure on the inside and the pressure on the outside of the rolling bearing 7. Accordingly, it is possible to prevent the rolling bearing 7 from being damaged at an early stage, to thereby achieve a longer life-time of the pulley structure 101.

In the outer edge portion 152 of the end cap 105, at least the first seal portion 153 and the second seal portion 154 which come into contact with the recessed portion 22 of the first rotating body 2 are formed by the elastic portion 155 made of an elastic body, and the outer edge portion 152 of the end cap 105 is fitted to the recessed portion 22 in a state of being compressed in the radial direction. Therefore, since the sealing properties between the first seal portion 153 and the recessed portion 22 are high, it is possible to more reliably realize the configuration in which the spring accommodation space 8 does not communicate with the outside toward the front side via a path other than the ventilation path 110.

Since the end cap 105 has the rigid portion 156 that has higher rigidity than that of the elastic portion 155 and is integrated with the elastic portion 155, the rigid portion 156 can suppress deformation of the end cap 105. Therefore, it is possible to further enhance the sealing properties between the first seal portion 153 and the second seal portion 154, and the recessed portion 22.

Since the ventilation path 110 includes the cutout ventilation paths 116 and 117 which are formed by cutting out a part of each of the seal portions 153 and 154 of the end cap 105, the ventilation path 110 is formed in the vicinity of the outer edge portion 152 of the end cap 105. When the first rotating body 2 and the end cap 105 rotate, a moving speed of the aqueous medium such as muddy water, which adheres to more inner side than the outer edge portion 152 of the end cap 105, increases as it moves to more outer side in the radial direction, due to the action of the centrifugal force. Therefore, the aqueous medium such as muddy water is unlikely to infiltrate into the ventilation path 110 formed in the vicinity of the outer edge portion 152 of the end cap 105, and it is possible to more reliably prevent the aqueous medium such as muddy water from infiltrating into the spring accommodation space 8.

In addition, since the cutout ventilation paths 116 and 117 are formed by cutting out the seal portions 153 and 154 formed by the elastic portion 155, it is possible to easily form the ventilation path 110.

In the first cutout ventilation path 116 and the second cutout ventilation path 117 which are formed by cutting out a part of the outer edge portion 152, the front end portion of the first cutout ventilation path 116 positioned in the front side is covered with the recessed portion 22 when viewed from the front side. In other words, the front end portion of the first cutout ventilation path 116 is hidden in the inner side of the recessed portion 22. Therefore, it is possible to more reliably prevent the aqueous medium such as muddy water, which scatters on the outside of the pulley structure 101, from directly infiltrating into the first cutout ventilation path 116.

The ventilation path 110 includes the first cutout ventilation path 116 formed by cutting out a part of the first seal portion 153 that comes into contact with the bottom surface 22a of the recessed portion 22, and the second cutout ventilation path 117 formed by cutting out a part of the second seal portion 154 that comes into contact with the rear side surface 22c of the recessed portion 22. Therefore, the orientation of the ventilation path 110 changes in the middle of reaching the spring accommodation space 8 from the part that extends along the bottom surface 22a of the recessed portion 22 (first cutout ventilation path 116). Accordingly, even when the aqueous medium such as muddy water infiltrates into the ventilation path 110 from the outside, it is possible to prevent the aqueous medium such as muddy water from easily infiltrating into the spring accommodation space 8.

Since a part of the outer edge portion 152 protrudes to the front side than the recessed portion 22, even when the aqueous medium such as muddy water, which adheres to more inner side than the outer edge portion 152 of the end cap 105, moves to the outer side in the radial direction due to the action of the centrifugal force, it is unlikely to infiltrate into the recessed portion 22. Accordingly, it is possible to more reliably prevent the aqueous medium such as muddy water from infiltrating into the spring accommodation space 8 via the ventilation path 110.

Third Embodiment

Next, a pulley structure 201 of a third embodiment of the present invention will be described. Configurations similar to those of the above-described first or second embodiment will be given the same reference numerals, and the description thereof will be appropriately omitted. As illustrated in FIG. 7 and FIG. 8, in the pulley structure 201 of this embodiment, the configuration of an end cap 205 is different from that of the end caps 5 and 105 of the first and second embodiments, and the other configuration is the same as that of the first and second embodiments.

In the end cap 205, an elastic portion 255 and the rigid portion 156 are integrally formed with each other. The end cap 205 is configured of the disk portion 151 and an outer edge portion 252. In the end cap 205, relative positions of the first cutout 153a and the second cutout 154a are different from those of the second embodiment, and the other configuration is the same as the end cap 105 of the second embodiment.

In this embodiment, two second cutouts 154a are respectively formed at a position shifted by 90° from the first cutout 153a. The shapes of the first cutout 153a and the second cutouts 154a are the same as those of the second embodiment. (a) of FIG. 7 is a cross-sectional view when the pulley structure 201 is cut at the same position as A-A line of FIG. 8, and (b) of FIG. 7 is a cross-sectional view when the pulley structure 201 is cut at the same position as B-B line of FIG. 8.

The spring accommodation space 8 communicates with the outside of the pulley structure 201 via the void 11 between the sliding bearing 6 and the inner circumferential surface of the first rotating body 2, the void 12 between the outer circumferential surface of the outer cylindrical portion 32 of the second rotating body 3 and the inner circumferential surface of the first rotating body 2 on a front side of the void 11, the two second cutout ventilation paths 117, the void 118, two first cutout ventilation paths 116, and the void 119. The above-described path which reaches the outside from the spring accommodation space 8 is a ventilation path 210. In FIG. 8, a flow of the air toward the spring accommodation space 8 from the outside is illustrated by a thick-lined arrow. The ventilation path 210 is formed at the position shifted in the radial direction from the rotating axis of the first rotating body 2. The ventilation path 210 changes the orientation from the axis direction to the circumferential direction and thereafter, further changes the orientation from the circumferential direction to the inside in the radial direction while reaching the second cutout ventilation path 117 from the first cutout ventilation path 116 via the void 118. The ventilation path 210 branches in two directions in the circumferential direction from the first cutout ventilation path 116, and reaches the two second cutout ventilation paths 117.

In the pulley structure 201 of this embodiment, configurations similar to those of the pulley structure 101 of the second embodiment achieve effects similar to the effects described in the second embodiment. The pulley structure 201 of this embodiment has the following characteristics in addition thereto. The ventilation path 210 branches in a plurality of directions in the middle of reaching the spring accommodation space 8. Therefore, it is possible to more reliably ensure ventilation between the spring accommodation space 8 and the outside. In addition, the ventilation path 210 changes its orientation the plurality of times in the middle of reaching the spring accommodation space 8, and has a longer pass as compared to the ventilation path 110 of the second embodiment. Therefore, the aqueous medium such as muddy water is more unlikely to infiltrate into the spring accommodation space 8 from the outside via the ventilation path 210.

Above, appropriate embodiments of the present invention are described, but the present invention is not limited to the above-described first to third embodiments, and various changes can be made.

In the first to third embodiments, as the rolling bearing 7, a contact seal type-sealed ball bearing is used, but the rolling bearing which is employed in the pulley structure of the present invention may be a rolling bearing other than the contact seal type-sealed ball bearing. For example, a shield type- or non-contact seal type-sealed rolling bearing may be employed. In addition, a roller bearing which uses not a ball but a roller as the rolling body may be employed.

In the above-described first embodiment, the circular hole 51a is formed on more inner side in the radial direction than the spring accommodation space 8, but the circular hole 51a may be formed at a position aligned with the spring accommodation space 8 in the rotating axis line direction. In this modified example, the circular hole 51a may be formed in the disk portion 51, or may be formed in the outer edge portion 52.

In the above-described first embodiment, the circular hole 51a penetrates a part formed only of the elastic portion 55, but may penetrate a part at which the rigid portion 56 and the elastic portion 55 are layered.

In the above-described first embodiment, only one circular hole 51a is provided in the end cap 5, but the plurality of circular holes 51a may be provided. In this configuration, it is possible to more reliably ensure ventilation between the outside and the spring accommodation space 8. In addition, in this modified example, the diameters of each of the circular holes 51a are the same as those in the first embodiment.

The above-described first embodiment and the second or third embodiment may be performed in combination. In other words, in the end cap, the circular hole 51a, and the first cutout ventilation path 116 and the second cutout ventilation path 117 may be provided. In this configuration, it is possible to more reliably ensure ventilation between the outside and the spring accommodation space 8.

In the above-described second and third embodiments, the first cutout ventilation path 116 extends in a shape of a straight line in the rotating axis direction, but may extend with being inclined in the circumferential direction with respect to the rotating axis direction. In other words, the position of the front end and the position of the rear end of the first cutout ventilation path 116 may be shifted in the circumferential direction. In addition, in the above-described second and third embodiments, the second cutout ventilation path 117 extends in a shape of a straight line in the radial direction, but may extend with being inclined in the circumferential direction with respect to the radial direction. In other words, the position of the end portion on the inner side in the radial direction and the position of the end portion on the outer side in the radial direction of the second cutout ventilation path 117 may be shifted in the circumferential direction.

In the above-described second and third embodiments, the cross-sectional shape of the first cutout 153a is formed in a substantially arc shape, but may be formed in a shape other than the arc shape, such as a triangular shape (V-like shape) or a rectangular shape.

In the second and third embodiments, two first cutout ventilation paths 116 are provided in the end caps 105 and 205, but only one first cutout ventilation path 116 may be provided, or three or more thereof may be provided. As the number of first cutout ventilation paths 116 increases, it is possible to more reliably ensure ventilation between the outside and the spring accommodation space 8.

In the above-described second and third embodiments, the number of second cutout ventilation paths 117 is the same as the number of first cutout ventilation paths 116, but may be larger or smaller than the number of first cutout ventilation paths 116. As the number of second cutout ventilation paths 117 increases, it is possible to more reliably ensure ventilation between the outside and the spring accommodation space 8.

In the above-described second embodiment, the second cutout ventilation path 117 is formed at the same position as the first cutout ventilation path 116 in the circumferential direction, whereas in the above-described third embodiment, the second cutout ventilation path 117 is formed at the position shifted in the circumferential direction from the first cutout ventilation path 116. However, both of the second cutout ventilation path 117 formed at the same position as the first cutout ventilation path 116 in the circumferential direction and the second cutout ventilation path 117 formed at the position at which the first cutout ventilation path 116 is not formed, may be provided in the end cap. For example, in a case where the two second cutout ventilation paths 117 are provided on both sides in the circumferential direction of another second cutout ventilation path 117 formed at the same position as the first cutout ventilation path 116 in the circumferential direction, the ventilation path branches in three directions (specifically, two directions in the circumferential direction and one direction inward in the radial direction) from the first cutout ventilation path 116, and reaches three second cutout ventilation paths 117. In this configuration, it is possible to more reliably ensure ventilation between the outside and the spring accommodation space 8.

In the above-described first to third embodiments, the outer edge portions 52, 152, and 252 come into contact with the recessed portion 22 by the first seal portions 53 and 153 and the second seal portions 54 and 154, but the outer edge portion may have an additional seal portion (hereinafter, referred to as a third seal portion) which comes into contact with the front side surface 22b of the recessed portion 22. The third seal portion may come into contact not only with the front side surface 22b of the recessed portion 22 but also with the part on a front side than the recessed portion 22 in the inner circumferential surface of the opening portion 21 of the first rotating body 2.

In the case where the outer edge portion 52 has the above-described third seal portion, as a modified example of the second and third embodiments, a third cutout (third cutout ventilation path) may be formed by cutting out a part of the third seal portion. In the case where the third seal portion comes into contact only with the front side surface 22b of the recessed portion 22, the third cutout is preferably formed within the area covered with the recessed portion 22 when viewed from the front side. In other words, the end portion on the inner side in the radial direction of the third cutout is preferably positioned on more outer side in the radial direction than the end portion on the inner side in the radial direction of the front side surface 22b of the recessed portion 22.

In the second embodiment, the ventilation path 110 reaches the second cutout ventilation path 117 from the first cutout ventilation path 116 by changing the orientation inward in the radial direction, whereas in the third embodiment, the ventilation path 210 reaches the second cutout ventilation path 117 from the first cutout ventilation path 116 by changing the orientation in the circumferential direction and thereafter, changing the orientation inward in the radial direction. However, the orientation of the part that links the first cutout ventilation path 116 and the second cutout ventilation path 117 to each other is not limited thereto. For example, as a ventilation path 310 illustrated in FIG. 9, it may be configured to have a part that extends in the circumferential direction, a part that extends inward in the radial direction and a part that extends outward in the radial direction between the first cutout ventilation path 116 and the second cutout ventilation path 117.

The modified example of FIG. 9 will be described in detail hereinafter. An outer edge portion 352 of an end cap 305 is provided with a plurality of barrier portions 357, which come into contact with the vicinity of an edge portion between the bottom surface 22a and the rear side surface 22c of the recessed portion 22, at an interval in the circumferential direction. Furthermore, in a second seal portion 354 of the outer edge portion 352, a cutout 354b is formed such that the voids 118 split by the barrier portion 357 are linked to each other with a detour to the inner side in the radial direction of the barrier portion 357. A cutout ventilation path 320 is formed between the cutout 354b and the rear side surface 22c of the recessed portion 22. The ventilation path 310 is configured such that the voids 118 and the cutout ventilation paths 320 are alternately disposed between the first cutout ventilation path 116 and the second cutout ventilation path 117, and that its orientation is changed from the axis direction to the circumferential direction and then, the orientation is changed to inward in the radial direction, the circumferential direction, and the outward in the radial direction while reaching the second cutout ventilation path 117 from the first cutout ventilation path 116.

In the above-described first to third embodiments, a part of the outer edge portions 52, 152 and 252 protrudes further to the front side than the recessed portion 22, but may not protrude further to the front side than the recessed portion 22.

EXAMPLES

Hereinafter, specific Examples of the present invention will be described.

By using the pulley structures in Examples 1 to 6, Comparative Examples 1 and 2, and Reference Examples 1 to 6 shown in Table 1, tests for demonstrating the effects of the present invention were performed.

TABLE 1

|  | Comp. Ex. 1 | Comp. Ex. 2 | Ref. Ex. 1 | Ex. 1 | Ex. 2 | Ex. 3 | Ref. Ex. 2 | Ex. 4 | Ex. 5 | Ref. Ex. 3 | Ref. Ex. 4 | Ref. Ex. 5 | Ex. 6 | Ref. Ex. 6 |
| --- | --- | --- | --- | --- | --- | --- | --- | --- | --- | --- | --- | --- | --- | --- |
| Circular hole | Nil | Exist | Exist | Exist | Exist | Exist | Exist | Nil | Nil | Nil | Nil | Nil | Nil | Nil |
| Diameter (mm) | — | 1.0 | 0.4 | 0.5 | 1.0 | 1.2 | 1.4 | — | — | — | — | — | — | — |
| Number of dispositions | — | 1 | 1 | 1 | 1 | 1 | 1 | — | — | — | — | — | — | — |
| Offset amount (mm) | — | 0 | 2 | 2 | 2 | 2 | 2 | — | — | — | — | — | — | — |
| First cutout | Nil | Nil | Nil | Nil | Nil | Nil | Nil | Exist | Exist | Exist | Exist | Exist | Exist | Exist |
| Width (mm) | — | — | — | — | — | — | — | 0.3 | 2 | 2 | 2 | 2 | 2 | 2 |
| Depth (mm) | — | — | — | — | — | — | — | 0.1 | 0.3 | 0.4 | 1.2 | 1.4 | 0.3 | 1.2 |
| Presence or Absence of branching | — | — | — | — | — | — | — | Nil | Nil | Nil | Nil | Nil | Exist | Exist |
| Number of depositions | — | — | — | — | — | — | — | 1 | 2 | 2 | 2 | 2 | 2 | 2 |
| Offset amount (mm) | — | — | — | — | — | — | — | 28 | 28 | 28 | 28 | 28 | 28 | 28 |
| Muddy water infiltration | A | C | A | A | A | A | C | A | A | B | B | C | A | B |
| Blocking of ventilation path | — | A | C | A | A | A | A | A | A | A | C | C | A | A |
| Residual ratio of grease (wt %) | C | — | — | A | A | A | — | A | A | — | — | — | A | — |
|  | — | — | — | 60 | 60 | 60 | — | 60 | 60 | — | — | — | 60 | — |

Examples 1 to 3

The pulley structures of Examples 1 to 3 have a configuration similar to that of the pulley structure 1 of the first embodiment, and are different from each other only in diameter of the circular hole (51a) as shown in Table 1. The bottom surface (22a) of the recessed portion (22) has a diameter of 56 mm, and the front side surface (22b) of the recessed portion (22) has a length in the radial direction of 0.4 mm. The elastic portion (55) of the end cap (5) is a rubber composition made of nitrile rubber (NBR), which has a JISA hardness of 70. The rigid portion (56) of the end cap (5) is an electrogalvanized steel sheet having a thickness of 0.5 mm. In the elastic portion (55), the part overlapping the rigid portion (56) in the disk portion (51) has a thickness of 0.3 mm. The center part formed only of the elastic portion (55) in the end cap (5) has a diameter of 6.0 mm.

Incidentally, the "offset amount" of the circular hole in Table 1 is a separation distance between the center of the circular hole (51a) and the center of the end cap (5).

Example 4

The pulley structure of Example 4 is a modified aspect of the pulley structure 101 of the second embodiment. The pulley structure of Example 4 has one first cutout ventilation path (116) and one second cutout ventilation path (117), which are formed at the same position in the circumferential direction. The material and the thickness of the elastic portion and the rigid portion are the same as those in Examples 1 to 3. In a state where the end cap is not fitted to the recessed portion (22), the first cutout (153a) has a cutout depth of 0.15 mm, a width of 0.3 mm and a radius of curvature of 0.15 mm. In a fitted state, the cutout depth of the first cutout is 0.1 mm. The second cutout (154a) has a cutout depth of 0.1 mm, a cutout width of 0.3 mm, and a cross-sectional shape of a rectangular shape. Incidentally, the "depth" in Table 1 is the cutout depth of the first cutout in the fitted state. In addition, "offset amount" of the first cutout in Table 1 is a separation distance between the end portion on the outer side in the radial direction of the first cutout ventilation path and the center of the end cap, and is the same as the radius of the bottom surface (22a) of the recessed portion (22).

Example 5

The pulley structure of Example 5 has a configuration similar to that of the pulley structure 101 of the second embodiment. The material and the thickness of the elastic portion (155) and the rigid portion (156) are the same as those in Examples 1 to 4. In a state where the end cap (105) is not fitted to the recessed portion (22), the first cutout (153a) has a cutout depth (D) of 0.4 mm, a width of 2.0 mm and a radius of curvature of 1.5 mm. In the fitted state, the cutout depth (D) of the first cutout (153a) is 0.3 mm, and the flow path-sectional area of the first cutout ventilation path (116) is approximately 0.3 mm$^2$. The shape of the second cutout (154a) is the same as that in Example 4.

Example 6

The pulley structure of Example 6 has a configuration similar to that of the pulley structure 201 of the third embodiment. The material and the thickness of the elastic portion (255) and the rigid portion (156) are the same as those in Examples 1 to 5. The shape of the first cutout (153a) is the same as that of Example 5. The shape of the second cutout (154a) is the same as those in Examples 4 and 5.

Comparative Example 1

The pulley structure of Comparative Example 1 has the same configuration as the pulley structures of Examples 1 to 6 except that no ventilation path (a circular hole and a cutout ventilation path) is formed in the end cap.

Comparative Example 2

The pulley structure of Comparative Example 2 has the same configuration as the pulley structure of Example 2 except that the circular hole of the end cap is formed on the rotating axis line.

Reference Examples 1 and 2

The pulley structures of Reference Examples 1 and 2 have the same configuration as the pulley structures of Examples 1 to 3 except that the diameter of the circular hole of the end cap falls outside the range of 0.5 mm or larger and 1.2 mm or smaller.

Reference Examples 3 to 5

The pulley structures of Reference Examples 3 to 5 have the same configuration as the pulley structure of Example 5 except that the depth of the first cutout is formed to be larger than that in Example 5. The depth of the first cutout in Reference Examples 3 to 5 increases in this order. In Reference Example 3, the cutout depth of the first cutout in the fitted state is the same as the length in the radial direction of the front side surface (22b) of the recessed portion (22). In addition, in Reference Example 4, the first cutout is formed on more inner side in the radial direction than the most front end of the outer edge portion, and in the forward-and-rearward direction (rotating axis direction) illustrated in FIG. 1 or the like, the most front end of the first cutout and the front side surface (22b) of the recessed portion (22) are at the same position. Therefore, when viewed from the front side, the first cutout ventilation path is not completely covered with the recessed portion and a part thereof is exposed, and in the area in the circumferential direction in which the first cutout ventilation path is formed, the outer edge portion does not protrude to the front side than the recessed portion.

Reference Example 6

The pulley structure of Reference Example 6 has the same configuration as the pulley structure of Example 6 except that the depth of the first cutout is formed to be larger than that in Example 6. The cutout depth of the first cutout in Reference Example 6 is the same as that in Reference Example 4.

(Muddy Water Drop Test)

By using the pulley structures of Examples 1 to 6, Comparative Example 1 and 2, and Reference Examples 1 to 6, a test of investigating the presence or absence of infiltration of muddy water into the inner space of the pulley structure and foreign substances jamming of the ventilation path, when the muddy water drops to the pulley structure, was performed.

In this test, an idle durability testing machine 80 illustrated in FIG. 10 was used. The idle durability testing machine 80 has a configuration in which a V-ribbed belt 84 is wound over the pulley structure 82 disposed in the driving shaft of an alternator 81 and a crank pulley 83, and in which a timing belt 88 is wound over a timing pulley 85 fixed coaxially to the crank pulley 83 and a timing pulley 87 linked to the rotating shaft of the motor 86. In addition, above the pulley structure 82, a muddy water dropping device (not illustrated) was disposed. The muddy water dropping device drops muddy water onto the upper surface of the belt 84 wound around the pulley structure 82. The composition of the muddy water used consists of 70% by weight of tap water and 30% by weight of eight types of powder (Kanto loam) for test JIS-Z8901:2006.

In the test, assuming an idling state during a low speed operation of a practical vehicle, the idle durability testing machine 80 was operated under the following conditions.

Number of rotations of crank pulley 83: 500 to 800 rpm
Number of rotations of alternator 81 and pulley structure 82: 2500 rpm
Surface temperature of alternator 81 and pulley structure 82: 40° C. to 50° C.

While operating the idle durability testing machine 80 under the above-described conditions, the muddy water dropping device was operated for 400 cycles with taking 70.5 minutes in total as shown in Table 2 as one cycle. The muddy water adhering to the belt 84 scattered in accordance with the movement of the belt 84 and adhered to the entire surface of the pulley structure including the end cap.

TABLE 2

| Time (minutes) | Drop of muddy water |
| --- | --- |
| 45 | Nil |
| 0.5 | 500 cc/minute |
| 25 | Nil |

After completion of the test, the presence or absence of infiltration of the muddy water and the presence or absence of blocking of the ventilation path was investigated. The results thereof are also shown in Table 1. The determination of the presence or absence of infiltration of the muddy water was performed such that the pulley structure was visually observed as it was, or visually observed after removing the end cap. In the field of "muddy water infiltration" of Table 1, the case where there is no trace of infiltration of muddy water not only in the spring accommodation space (8) but also in any of the circular hole (51a), the first cutout ventilation path (116) and the second cutout ventilation path (117) is marked as "A", the case where there is no trace of infiltration of muddy water in the spring accommodation space (8) but there is a trace of infiltration of muddy water in any of the circular hole (51a), the first cutout ventilation path and the second cutout ventilation path is marked as "B", and the case where there is a trace of infiltration of muddy water in the spring accommodation space (8) is marked as "C".

The presence or absence of blocking of the ventilation path was investigated in the following manner. A hole penetrating the first rotating body (2) in the radial direction to allow the spring accommodation space (8) to communicate with the outside was formed in advance, and the hole was blocked by a blank cap. In addition, a plurality of holes penetrating the cylindrical main body (31) of the second rotating body (3) in the radial direction to allow the spring accommodation space (8) to communicate with the space on the inner side of the cylindrical main body (31) (the void (14) between the front end of the alternator driving shaft (S) and the end cap), were formed in advance. After completion of the test, the blank cap was removed and an incense stick which is on fire was inserted into the hole formed in the first rotating body (2). At this time, as the air goes in and out through the plurality of holes formed on the end cap side of the second rotating body (3), it is possible to reliably fill the space (ventilation path) further on the end cap side than the spring accommodation space (8) with smoke of the incense stick. After filling the spring accommodation space (8) and the ventilation path with the smoke of the incense stick, the incense stick was removed and the hole provided in the first rotating body was blocked by using a blank cap and then, whether or not the smoke leaks from the ventilation path was visually observed. In the field of "blocking of ventilation path" of Table 1, the case where the smoke leaks out to the outside from the ventilation path is marked as "A" (there is no blocking of ventilation path), and the case where the smoke does not leak out to the outside from the ventilation path is marked as "C" (there is a blocking of ventilation path).

As shown in Table 1, in Comparative Example 1, muddy water did not infiltrate into the spring accommodation space. From this result, it is ascertained that the sealing properties of the first seal portion of the end cap are high. In Comparative Example 2, there was no blocking of the ventilation path, but muddy water infiltrated into the spring accommodation space. It is considered that since the circular hole is formed on the rotating axis line in Comparative Example 2, the action of the centrifugal force does not act on the muddy water adhering to the periphery of the circular hole and the muddy water is likely to infiltrate into the circular hole. In Examples 1 to 6, neither infiltration of muddy water into the spring accommodation space nor blocking of the ventilation path was seen.

In Reference Example 1, there was no infiltration of muddy water into the circular hole, but the ventilation path was blocked. Specifically, it was visually confirmed that the opening end on the outer side of the circular hole is blocked. In Reference Example 1, although the circular hole is formed at the position shifted in the radial direction from the rotating axis line, the circular hole is excessively small. Therefore, it is considered that muddy water is likely to adhere to block the opening end on the outer side of the circular hole due to the surface tension, and that the muddy water does not completely fly by the centrifugal force and is put into a dried state to block the circular hole.

In Reference Example 2, there was no blocking of the ventilation path, but muddy water infiltrated into the spring accommodation space. It is considered that although the circular hole is formed at the position shifted in the radial direction from the rotating axis line in Reference Example 2, the circular hole becomes excessively large and thus, the muddy water is likely to infiltrate into the circular hole.

From the result of Reference Examples 1 and 2 and Examples 1 to 3, it is ascertained that the diameter of the circular hole is preferably 0.5 mm or larger and 1.2 mm or smaller.

In Reference Example 3, there was no blocking of the ventilation path, but the trace of infiltration of muddy water was found in the first cutout ventilation path. It is considered that since the cutout depth of the first cutout (length in the radial direction of the first cutout ventilation path) is the same as the length in the radial direction of the front side surface (22b) of the recessed portion (22) in Reference Example 3, the muddy water is likely to infiltrate into the first cutout ventilation path.

In Reference Example 4, muddy water did not infiltrate into the spring accommodation space, but the second cutout ventilation path was blocked. In Reference Example 5, muddy water infiltrated into the spring accommodation space, and in addition, the second cutout ventilation path was blocked. It is considered that in Reference Examples 4 and 5, since the first cutout ventilation path is not completely covered with the recessed portion and a part thereof is exposed when viewed from the front part, and since the outer edge portion does not protrude to the front side than the recessed portion in the area in the circumferential direction in which the first cutout ventilation path is formed, muddy water is likely to infiltrate into the first cutout ventilation path.

In Reference Example 6, muddy water infiltrated into the first cutout ventilation path, but there was no blocking of the ventilation path. The depth of the first cutout in Reference Example 6 is the same as that in Reference Example 4, but similar to the ventilation path 210 of the third embodiment, the ventilation path in Reference Example 6 branches in two directions and reaches the second cutout ventilation path from the first cutout ventilation path. Therefore, infiltration of muddy water into the second cutout ventilation path is exempted.

From the results of Examples 4 to 6 and Reference Examples 3 to 6, it is ascertained that the depth of the first cutout (length in the radial direction of the first cutout ventilation path) is preferably smaller than the length in the radial direction of the front side surface of the recessed portion.

(Bearing Grease Residual Amount Confirming Test)

By using the pulley structures of Examples 1 to 6 and Comparative Example 1, the test of investigating a residual amount of bearing grease in the rolling bearing (7) was performed.

In the test, similar to the muddy water drop test, the idle durability testing machine 80 illustrated in FIG. 10 was used. However, the muddy water dropping device was not used, and the alternator 81, the pulley structure 82 and the crank pulley 83 were covered with a thermostat which maintains an ambient temperature to be constant.

In the test, assuming an idling state of a practical vehicle in which the temperature of the inner space of the pulley structure becomes the maximum and rotation variation becomes the largest, the idle durability testing machine 80 was operated under the following conditions.

Number of rotations of crank pulley 83: 500 to 800 rpm
Number of rotations of alternator 81 and pulley structure 82: 2000 to 2500 rpm
Surface temperature of alternator 81 and pulley structure 82 (temperature in thermostat): 130° C.

After the idle durability testing machine 80 was continuously operated for 2,000 hours under the above-described conditions, the pulley structure was cooled to a room temperature. Then, the pulley structure was disassembled, and the weight of the rolling bearing was measured. In addition, before the test, the weight of the rolling bearing before filling the inside with the bearing grease and the weight of the bearing grease that fills the inside of the rolling bearing were measured in advance. A residual ratio of the bearing grease was calculated from the weight of the rolling bearing after the test. The result thereof is also shown in Table 1. In the field of the "Residual Ratio of Grease" in Table 1, the case where the residual ratio of the bearing grease is 30% by weight or more is marked as "A", and the case of less than 30% by weight is marked as "C". From the viewpoint of the function of the rolling bearing, there is no problem as long as the residual ratio of the bearing grease is 30% by weight or more.

In Comparative Example 1, a burning state (carbonization state due to shortage of grease) was recognized on the inside of the rolling bearing after 1,200 hours of test time, and the rolling bearing was broken. In all Examples 1 to 6, the residual ratio of grease was 60% by weight.

(Other Tests)

Although specific description will be omitted, in a complex environment cycle test (1 cycle is 24 hours) in which salt spraying (in accordance with JISK5600-7-1) and drying are repeated, the effects of the rust-preventive agent were demonstrated by using the pulley structure of Example 2. As a result, in the case where the spring accommodation space is not filled with the rust-preventive agent, a symptom of rust generation was recognized on the inner surface of the first rotating body after 60 cycles (1440 hours), but in the case where the spring accommodation space is filled with the rust-preventive agent, there was no symptom of rust generation on the inner surface of the first rotating body even after 90 cycles (2160 hours). In addition, in the case where a conventional pulley structure of a resin end cap as in the above-described Patent Document 1 was used and the inside was not filled with the rust-preventive agent, the rust was generated on the inner surface of the first rotating body after 5 cycles (120 hours).

In addition, although specific description will be omitted, a test of investigating the effects of the surface hardening treatment of the first rotating body (2) was performed. The material of the first rotating body (2) used in the test was S45C, and the surface hardening treatment was soft-nitriding treatment. While Vickers' hardness before the surface treatment is HV200, Vickers' hardness after the surface treatment is HV600. The pulley structure of Comparative Example to which the surface treatment had not been performed and the pulley structure of Example to which the surface treatment had been performed were installed on a test machine, and sliding stress corresponding to the lifetime of a practical vehicle was imparted to the respective pressure contact surface (2*a*) by alternately repeating the rotation for a short period of time and stopping. As a result, the average wear depth of the pressure contact surface of Comparative Example was 70 μm, but the average wear depth of the pressure contact surface (2*a*) of Example was 50 μm. In other words, the degree of wear on the pressure contact surface (2*a*) was reduced by approximately 30% in the wear depth as compared to the case where the surface treatment was not performed. Incidentally, the wire material of the torsion coil spring (4) used at this time is an oil tempered wire for spring (in accordance with JISG3560), and the cross-sectional shape thereof is a rectangular shape.

In addition, although specific description will be omitted, the test of investigating the effects obtained by chamfering the edge portion of the pressure contact surface (2*a*) of the first rotating body (2) into a tapered shape was performed. The first rotating body (2) and the torsion coil spring (4) which are used in the test are the same as those in the test of the above-described surface hardening treatment, and the test machine used is also the same. The pulley structure of Comparative Example chamfered by 45° (specifically, chamfered by C0.3 mm) and the pulley structure of Example chamfered by 15° were installed in the test machine, and sliding stress corresponding to the lifetime of a practical vehicle was imparted to the pressure contact surface (2*a*). As a result, at the position of the edge portion of the pressure contact surface, Comparative Example showed the wear depth of 110 microns, but Example showed the wear depth of 30 μm. That is, the degree of wear at the position of the edge portion of the pressure contact surface (2a) was reduced by approximately 70% in the wear depth as compared to a case of chamfering by 45°.

The present application is based on Japanese Patent Application No. 2015-031338 filed on Feb. 20, 2015, and on Japanese Patent Application No. 2016-011352 filed on Jan. 25, 2016, the contents of which are incorporated herein by reference.

DESCRIPTION OF REFERENCE NUMERALS AND SIGNS 1, 101, 201 Pulley Structure
2 First Rotating Body
3 Second Rotating Body
4 Torsion Coil Spring
5, 105, 205, 305 End Cap
6 Sliding Bearing
7 Rolling Bearing
8 Spring Accommodation Space
9 Inner Space of Pulley Structure
10, 110, 210, 310 Ventilation Path
21 Opening Portion
22 Recessed Portion
51, 151 Disk Portion
51a Circular Hole (Substantially Circular Hole)
52, 152, 252, 352 Outer Edge Portion
53, 153 First Seal Portion
54, 154, 354 Second Seal Portion
55, 155, 255 Elastic Portion
56, 156 Rigid Portion
116 First Cutout Ventilation Path (Cutout Ventilation Path)
117 Second Cutout Ventilation Path (Cutout Ventilation Path)
153a First Cutout
154a Second Cutout
320 Cutout Ventilation Path
354b Cutout
B Belt

The invention claimed is:

1. A pulley structure comprising:
a cylindrical first rotating body around which a belt is wound, the first rotating body having a rotating axis;
a second rotating body provided on an inner side of the first rotating body to be relatively rotatable with respect to the first rotating body;
a torsion coil spring accommodated in a spring accommodation space formed between the first rotating body and the second rotating body;
an end cap that blocks an opening portion on one side of the first rotating body in a direction of the rotating axis;
a rolling bearing provided to be interposed between the first rotating body and the second rotating body on the other side in the rotating axis direction; and
a ventilation path that is formed at a position shifted in a radial direction from the rotating axis of the first rotating body and allows the spring accommodation space and the outside to communicate with each other,
wherein at least a part of the ventilation path is formed in the end cap,
wherein the end cap blocks the opening portion of the first rotating body such that the spring accommodation space communicates with the outside toward the one side in the rotating axis direction only via the ventilation path,
wherein the first rotating body has a recessed portion formed on an inner circumferential surface of the opening portion to extend in a circumferential direction,
wherein an outer edge portion of the end cap includes a seal portion being in contact with the recessed portion of the first rotating body, and
wherein the ventilation path comprises at least one cutout ventilation path formed by cutting out a part of the seal portion of the end cap.

2. The pulley structure according to claim 1, wherein
the end cap comprises an elastic portion formed of an elastic body and a rigid portion integrated with the elastic portion and having a higher rigidity than the elastic portion,
the outer edge portion of the end cap is fitted to the recessed portion in a state of being compressed in the radial direction.

3. The pulley structure according to claim 1, wherein the cutout ventilation path positioned the most on the one side in the rotating axis direction, among the at least one cutout ventilation path, is covered with the recessed portion when viewed from the one side in the rotating axis direction.

4. The pulley structure according to claim 1, wherein at least a part of the outer edge portion protrudes further to the one side in the rotating axis direction than the recessed portion.

5. The pulley structure according to claim 1, wherein the ventilation path is formed to change its orientation in the middle of reaching the spring accommodation space from a part that extends along a bottom surface of the recessed portion.

6. The pulley structure according to claim 5, wherein the seal portion comprises:
a first seal portion that is in contact with the bottom surface of the recessed portion; and
a second seal portion that is in contact with a side surface of the recessed portion on the other side in the rotating axis direction,
wherein the at least one cutout ventilation path comprises a first cutout ventilation path formed by cutting out a part of the first seal portion and a second cutout ventilation path formed by cutting out a part of the second seal portion.

7. The pulley structure according to claim 1, wherein the ventilation path branches in a plurality of directions in the middle of reaching the spring accommodation space.

8. The pulley structure according to claim 2, wherein the ventilation path penetrates a part on more inner side than the outer edge portion of the end cap, and includes a substantially circular hole having a diameter of 0.5 mm or larger and 1.2 mm or smaller.

9. The pulley structure according to claim 8, wherein the substantially circular hole is formed on more inner side in the radial direction than the spring accommodation space.

* * * * *